(12) United States Patent
Oh et al.

(10) Patent No.: US 12,156,196 B2
(45) Date of Patent: Nov. 26, 2024

(54) METHOD AND DEVICE FOR SCHEDULING IN WIRELESS COMMUNICATION SYSTEM SUPPORTING MULTI-CONNECTIVITY

(71) Applicant: Samsung Electronics Co., Ltd., Gyeonggi-do (KR)

(72) Inventors: Jinyoung Oh, Gyeonggi-do (KR); Taehyoung Kim, Gyeonggi-do (KR); Hyoungju Ji, Gyeonggi-do (KR); Jinhyun Park, Gyeonggi-do (KR); Youngrok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 436 days.

(21) Appl. No.: 17/543,007

(22) Filed: Dec. 6, 2021

(65) Prior Publication Data
US 2022/0191895 A1 Jun. 16, 2022

(30) Foreign Application Priority Data
Dec. 4, 2020 (KR) ........................ 10-2020-0168929

(51) Int. Cl.
*H04W 72/00* (2023.01)
*H04W 24/08* (2009.01)
(Continued)

(52) U.S. Cl.
CPC ....... *H04W 72/1263* (2013.01); *H04W 24/08* (2013.01); *H04W 72/121* (2013.01); *H04W 72/23* (2023.01)

(58) Field of Classification Search
None
See application file for complete search history.

(56) References Cited

U.S. PATENT DOCUMENTS

2016/0143084 A1* 5/2016 Liao ........................ H04L 5/001
370/225

FOREIGN PATENT DOCUMENTS

| CN | 105246106 | 2/2019 |
|---|---|---|
| KR | 10-2020-0098087 | 8/2020 |
| WO | WO 2014/112803 | 7/2014 |

OTHER PUBLICATIONS

Ericsson, "Enhanced Cross-Carrier Scheduling for DSS", R1-2009206, 3GPP TSG-RAN WG1 #103-e, Oct. 26-Nov. 13, 2020, 6 pages.
(Continued)

*Primary Examiner* — Abdelillah Elmejjarmi
(74) *Attorney, Agent, or Firm* — The Farrell Law Firm, P.C.

(57) ABSTRACT

The disclosure relates to 5G or 6G communication system for supporting higher data transmission rates than 4G communication systems such as LTE systems. A method performed by a terminal in a wireless communication system includes receiving first information including configuration information related to cell groups, receiving second information related to an interface used for exchanging scheduling information between cells included in the cell groups, receiving, through a control channel of a first cell included in a first cell group among the cell groups, based on the second information, third information including scheduling information about a second cell included in a second cell group among the cell groups, wherein the first cell group is different from the second cell group, and performing a transmission/reception operation with a base station through a data channel of the second cell, based on the third information.

20 Claims, 15 Drawing Sheets

(51) Int. Cl.
*H04W 72/121* (2023.01)
*H04W 72/1263* (2023.01)
*H04W 72/23* (2023.01)

(56) References Cited

OTHER PUBLICATIONS

ASUSTeK, "Discussion on Cross-Carrier Scheduling from SCell to PCell", R1-2008695, 3GPP TSG RAN WG1 #103, Oct. 26-Nov. 13, 2020, 6 pages.
CATT, "Discussion on Cross-Carrier Scheduling from SCell to PCell", R1-2007839, 3GPP TSG RAN WG1 #103-e, Oct. 26-Nov. 13, 2020, 6 pages.
International Search Report dated Mar. 10, 2022 issued in counterpart application No. PCT/KR2021/018042, 7 pages.

* cited by examiner

METHOD AND DEVICE FOR SCHEDULING IN WIRELESS COMMUNICATION SYSTEM SUPPORTING MULTI-CONNECTIVITY

CROSS-REFERENCE TO RELATED APPLICATION(S)

This application is based on and claims priority under 35 U.S.C. § 119 to Korean Patent Application No. 10-2020-0168929, filed on Dec. 4, 2020, in the Korean Intellectual Property Office, the entire disclosure of which is incorporated herein by reference.

BACKGROUND

1. Field

The disclosure relates generally to a scheduling method and device in a wireless communication system supporting multi-connectivity.

2. Description of Related Art

To meet the increasing demand for wireless data traffic, since the commercialization of a 4$^{th}$ generation (4G) communication system, efforts are being made to develop an advanced 5$^{th}$ generation (5G) communication system or a pre-5G communication system. The 5G communication system or the pre-5G communication system may also be referred to as a beyond 4G network communication system or a post long term evolution (LTE) system.

To achieve high data rates, implementation of the 5G communication system in a millimeter wave (mmWave) band (such as 60 GHz) is under consideration. Further, techniques such as beamforming, massive multiple input multiple output (MIMO), full dimension-MIMO (FD-MIMO), array antennas, analog beamforming, and large-scale antennas have been discussed to mitigate pathloss of waves and increase propagation distances of the waves in the mmWave band.

For system network improvement, techniques such as an evolved small cell, an advanced small cell, a cloud radio access network (RAN), an ultra-dense network, device-to-device (D2D) communication, a wireless backhaul, a moving network, cooperative communication, coordinated multi-point (CoMP), and reception interference cancellation are being developed in the 5G communication system.

Advanced coding modulation (ACM) schemes including hybrid frequency shift keying (FSK) and quadrature amplitude modulation (QAM) (FQAM) and sliding window superposition coding (SWSC), and advanced access schemes including filter bank multi carrier (FBMC), non-orthogonal multiple access (NOMA), and sparse code multiple access (SCMA) are being developed for the 5G system.

Considering the development of wireless communication from generation to generation, the technologies have been developed mainly for services targeting humans, such as voice calls, multimedia services, and data services. However, following the commercialization of 5G communication systems, it is expected that the number of connected devices will exponentially grow. Increasingly, these will be connected to communication networks. Examples of connected devices (or things) include vehicles, robots, drones, home appliances, displays, smart sensors connected to various infrastructures, construction machines, and factory equipment.

Mobile devices are expected to evolve in various form-factors, such as augmented reality glasses, virtual reality headsets, and hologram devices.

In order to provide various services by connecting hundreds of billions of devices and things in a 6th-generation (6G) era, there have been ongoing efforts to develop improved 6G communication systems. 6G communication systems may be referred to as beyond-5G systems.

6G communication systems, which are expected to be commercialized around 2030, will have a peak data rate of tera (1,000 giga)-level bps and a radio latency less than 100 μsec, which will be 50 times as fast as 5G communication systems and have $\frac{1}{10}$ of the radio latency thereof.

In order to accomplish such a high data rate and an ultra-low latency, it has been considered to implement 6G communication systems in a terahertz band (e.g., 95 GHz to 3 THz bands). It is expected that, due to more severe path loss and atmospheric absorption in the terahertz bands than those in mmWave bands introduced in 5G, technologies capable of securing the signal transmission distance (i.e., coverage) will become more crucial.

As such, it will be desirable to develop, as major technologies for securing the coverage, radio frequency (RF) elements, antennas, novel waveforms having a better coverage than orthogonal frequency division multiplexing (OFDM), beamforming and massive MIMO, FD-MIMO, array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

In order to improve spectral efficiency and overall network performance, the following technologies have been developed for 6G communication systems:
   a full-duplex technology for allowing an uplink (UL) transmission and a downlink (DL) transmission to simultaneously use the same frequency resource at the same time;
   a network technology for utilizing satellites, high-altitude platform stations (HAPS), etc., in an integrated manner;
   an improved network structure for supporting mobile base stations (BSs) and the like and allowing network operation optimization and automation and the like;
   a dynamic spectrum sharing technology via collision avoidance based on a prediction of spectrum usage;
   a use of artificial intelligence (AI) in wireless communication for improvement of overall network operation by utilizing AI from a designing phase for developing 6G and internalizing end-to-end AI support functions; and
   a next-generation distributed computing technology for overcoming the limit of user equipment (UE) computing ability through reachable super-high-performance communication and computing resources (such as mobile edge computing (MEC), clouds, etc.) over the network.

In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile holograms, and digital replicas could be provided through 6G communication systems.

In addition, services such as remote surgery for security and reliability enhancement, industrial automation, and emergency response will be provided through the 6G communication system, such that the technologies could be applied in various fields such as industry, medical care, automobiles, and home appliances.

SUMMARY

An aspect of the disclosure is to provide a scheduling method and device in a wireless communication system supporting multi-connectivity.

Another aspect of the disclosure is to provide a method and device for performing scheduling between cells in different cell groups in a wireless communication system.

In accordance with an aspect of the disclosure, a method is provided for a terminal in a wireless communication system. The method includes receiving first information including configuration information related to cell groups, receiving second information related to an interface used for exchanging scheduling information between cells included in the cell groups, receiving, through a control channel of a first cell included in a first cell group among the cell groups, based on the second information, third information including scheduling information about a second cell included in a second cell group among the cell groups, wherein the first cell group is different from the second cell group, and performing a transmission/reception operation with a base station through a data channel of the second cell, based on the third information.

In accordance with another aspect of the disclosure, a method is provided for a BS in a wireless communication system. The method includes transmitting first information including configuration information related to cell groups, transmitting second information related to an interface used for exchanging scheduling information between cells included in the cell groups, transmitting, through a control channel of a first cell included a first cell group among the cell groups, based on the second information, third information including scheduling information about a second cell included in a second cell group among the cell groups, wherein the first cell group is different from the second cell group, and performing a transmission/reception operation with a terminal through a data channel of the second cell, based on the third information.

In accordance with another aspect of the disclosure, a terminal is provided for use in a wireless communication system. The terminal includes a transceiver and a controller connected with the transceiver and configured to receive, via the transceiver, first information including configuration information related to cell groups, receive, via the transceiver, second information related to an interface used for exchanging scheduling information between cells included in the cell groups, receive, via the transceiver, through a control channel of a first cell included in a first cell group among the cell groups, based on the second information, third information including scheduling information about a second cell included in a second cell group among the cell groups, wherein the first cell group is different from the second cell group, and perform a transmission/reception operation, via the transceiver, with a base station, through a data channel of the second cell, based on the third information.

In accordance with another aspect of the disclosure, a BS is provided for use in a wireless communication system. The BS includes a transceiver and a controller connected with the transceiver and configured to transmit, via the transceiver, first information including configuration information related to cell groups, transmit, via the transceiver, second information related to an interface used for exchanging scheduling information between cells included in the cell groups, transmit, via the transceiver, through a control channel of a first cell included in a first cell group among the cell groups, based on the second information, third information including scheduling information about a second cell included in a second cell group among the cell groups, wherein the first cell group is different from the second cell group, and perform a transmission/reception operation, via the transceiver, with a terminal, through a data channel of the second cell, based on the third information.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
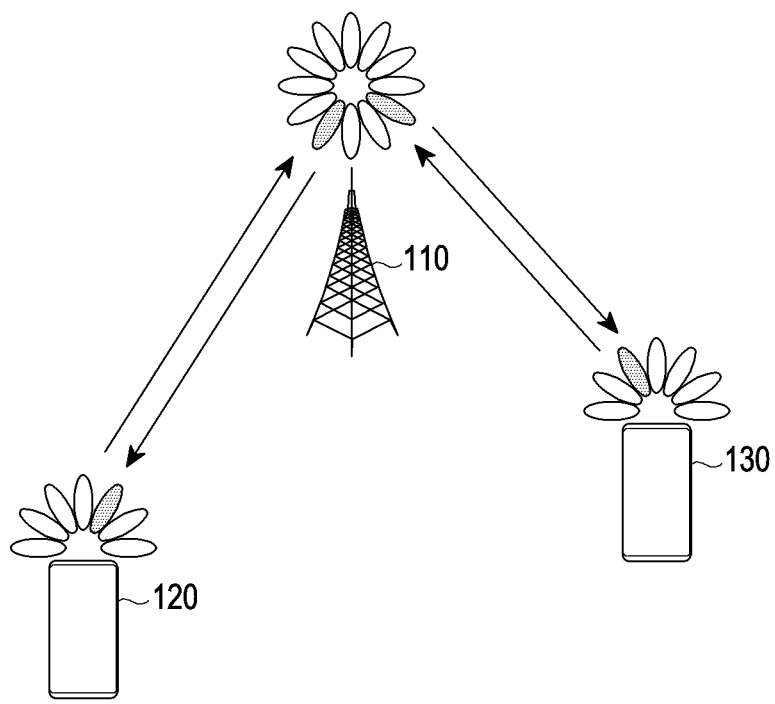
FIG. 1 illustrates a wireless communication system according to an embodiment.

Hereinafter, various embodiments are described with reference to the accompanying drawings. To avoid obscuring the subject matter of the disclosure, detailed descriptions of known art or functions may be avoided.

The terms described below are defined considering the functions in embodiments and may be replaced with other terms according to the intention or practice of the user or operator. Therefore, the terms should be defined based on the overall disclosure.

The terms as used herein are provided merely to describe some embodiments thereof, but not to limit the disclosure. The terms as used herein are provided merely to describe some embodiments thereof, but not to limit the scope of other embodiments. Unless otherwise defined, all terms including technical and scientific terms used herein have the same meaning as commonly understood by one of ordinary skill in the art to which the embodiments pertain and should not be interpreted as overly broad or narrow.

As used herein, terms wrong or inappropriate for representing the spirit may be replaced with and understood as more proper ones to represent the spirit by one of ordinary skill in the art. General terms as used herein should be interpreted in the context of the specification or as defined in dictionaries.

As used herein, the singular forms "a," "an," and "the" are intended to include the plural forms as well, unless the context clearly indicates otherwise. The term "comprise," "include," or "have" should be appreciated not to preclude the presence or addition of features, numbers, steps, operations, components, parts, or combinations thereof as set forth herein.

The terms "first" and "second" may be used to describe various components, but the components should not be limited by the terms. The terms are used to distinguish one component from another. For example, a first component may be denoted a second component, and vice versa without departing from the scope.

When an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

Further, the terms " ... unit"and the suffix" ... er" as used herein denote a unit processing at least one function or operation and be implemented in hardware, software, or a combination thereof.

Methods described below in connection with embodiments are based on hardware. However, embodiments encompass technology using both hardware and software and thus do not exclude software-based methods.

Although various embodiments of the disclosure are described below with reference to a UE as an example, the UE may also be referred to as an electronic device, a terminal, a mobile station (MS), a mobile equipment (ME), a user terminal, a subscriber station, a wireless device, a handheld device, an access terminal (AT), etc. Further, the UE may be a device with communication functionality, such as a personal digital assistant (PDA), a smartphone, a wireless modem, or a laptop computer.

Wireless communication systems have evolved beyond voice-centered services to broadband wireless communication systems to provide high data rate and high-quality packet data services, such as 3rd generation partnership project (3GPP) high speed packet access (HSPA), LTE or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

An LTE system, which is a representative wireless communication system, adopts an OFDM scheme for DL transmission and a single carrier frequency division multiple access (SC-FDMA) scheme UL transmission. The UL may refer to a radio link in which the UE transmits data or control signals to the BS, and the DL refers to a radio link through which the BS transmits data or control signals to the UE. The multiple access schemes may distinguish users' data or control information by allocating and operating time-frequency resources in such a way that the time-frequency resources that carry data or control information about each user do not overlap, i.e., orthogonality is established between the time-frequency resources.

Post-LTE communication systems, e.g., 5G communication systems, are being developed to support services that simultaneously meet various requirements. Services considered for 5G communication systems include enhanced mobile broadband (eMBB), massive machine type communication (MMTC), and ultra-reliability low latency communication (URLLC).

eMBB is intended to provide further enhanced data transmission rates as compared with LTE, LTE-A, or LTE-pro. For example, eMBB for 5G communication systems should provide a peak data rate of 20 Gbps on a DL and a peak data rate of 10 Gbps on a UL in terms of one BS. 5G communication systems should also provide an increased user perceived data rate while simultaneously providing such peak data rate.

To meet such requirements, transmit (TX)/receive (RX) techniques, as well as MIMO, should be further enhanced. While LTE adopts a TX bandwidth up to 20 MHz in the 2 GHz band to transmit/receive signals, the 5G communication system employs a broader frequency bandwidth in a frequency band ranging from 3 GHz to 6 GHz or more than 6 GHz to transmit/receive signals, and thus, may meet the data rate required for 5G communication systems.

mMTC is also considered to support application services, such as Internet of things (IoT) in the 5G communication system. To efficiently provide IoT, mMTC should support massive UEs in the cell, enhance the coverage of the UE and the battery time, and reduce UE costs.

IoT terminals may be attached to various sensors or devices to provide communication functionality, and thus, mMTC should support a number of UEs in each cell (e.g., 1,000,000 UEs/km$^2$). Since mMTC-supportive UEs, by the nature of service, are highly likely to be located in shadow areas not covered by the cell, such as the basement of a building, mMTC may require much broader coverage as compared with other services that the 5G communication system provides. mMTC-supportive UEs, due to being low cost and difficult to frequently exchange batteries therein, may be required to have an exceptionally long battery life, e.g., 10 years to years.

URLLC is intended for mission-critical, cellular-based wireless communication services. For example, URLLC may be considered for use in remote control for robots or machinery, industrial automation, unmanned aerial vehicles, remote health care, or emergency alerts. Accordingly, URLLC should provide very low-latency and very high-reliability communication. For example, URLLC-supportive services should meet an air interface latency of less than 0.5 milliseconds simultaneously with a packet error rate (PER) of $7^5$ or less. Thus, for URLLC-supportive services, the 5G communication system may be required to provide a shorter transmit time interval (TTI) than provided for other services, while securing reliable communication links by allocating a broad resource in the frequency band.

The above-described three 5G services, i.e., eMBB, URLLC, and mMTC, may be multiplexed in one system and transmitted. In this case, different transmission/reception schemes and transmission/reception parameters may be used between services to meet different requirements for each service. Of course, the 5G communication system is not limited to the three services as described above.

The description of embodiments focuses on the RAN, new radio (NR), and the core network, packet core (5G system, 5G core network, NG core, or next generation core), which are specified by the 3GPP. However, the subject matter, or slight changes thereto, may also be applicable to 5G or post-5G systems or other communication systems that share similar technical backgrounds without departing from the scope, which would readily be appreciated by one of ordinary skill in the art.

For ease of description, some of the terms or names defined in the 3GPP standards (e.g., standards for 5G, new radio (NR), LTE, etc.) may be used. However, the disclosure is not limited by such terms and names and may be likewise applicable to systems conforming to other standards.

As used herein, terms for identifying access nodes, terms denoting network entities, terms denoting messages, terms denoting inter-network entity interfaces, and terms denoting various pieces of identification information are provided as examples for ease of description. Accordingly, various embodiments are not limited to terms used in describing the disclosure, and other terms referring to objects having equivalent technical meanings may be used as well.

FIG. 1 illustrates a wireless communication system according to an embodiment.

Referring to FIG. 1, the wireless communication system includes a BS 110, a UE 120, and a UE 130 as nodes using wireless channels in the wireless communication system. Although only the one BS 110 is illustrated in FIG. 1, other BSs having the same or similar functions to those of the BS 110 may be further included.

The BS 110 provides wireless access to the UEs 120 and 130. The BS 110 has a coverage defined as a certain geographic area based on a distance within which it may transmit signals. The BS 110 may be denoted using other terms, such as an access point (AP), an eNodeB (eNB), a 5G node, a next generation nodeB (gNB), a wireless point, a transmission/reception point (TRP), or another term with an equivalent technical meaning.

The BS 110 may be a network entity including at least one of an integrated access and backhaul-donor (IAB-donor), which is a gNB providing network access to UEs through a network of backhaul and access links in the NR system, and an IAB-node, which is a RAN node supporting NR backhaul links to the IAB-donor or another IAB-node and supporting NR access links to UEs. The UE is wirelessly connected through the IAB-node and may transmit/receive data to and from the IAB-donor connected with at least one IAB-node through the backhaul link. The BS 110 may provide wireless access according to one or more radio protocols, e.g., 5G 3GPP NR, LTE, LTE-A, HSPA, or Wi-Fi 802.11a/b/g/n/ac.

Each of the UE 120 and the UE 130 $m$ be a device used by a user and performs communication with the BS 110 through a radio channel. Each of the UE 120 and the UE 130 may also be denoted using other terms, such as an MS, a subscriber station, a remote terminal, a wireless terminal, a user device, or another term with an equivalent technical meaning.

In some cases, at least one of the UE 120 and the UE 130 may be operated without a user's involvement. In this case, at least one of the UE 120 and the UE 130 may be a device that performs MTC and is not carried by a user.

Figure 2:
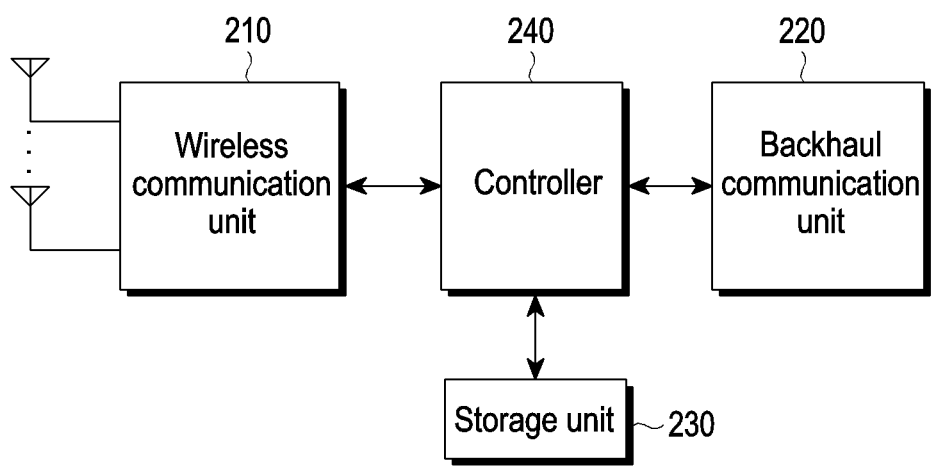
FIG. 2 illustrates an internal structure of a BS in a wireless communication system according to an embodiment.

FIG. 2 illustrates a BS in a wireless communication system according to an embodiment. For example, the BS 110 of FIG. 1 may be configured as illustrated in FIG. 2.

Referring to FIG. 2, the BS includes a wireless communication unit 210, a backhaul communication unit 220, a storage unit 230, and a controller 240.

The wireless communication unit 210, e.g., a transceiver, performs functions for transmitting/receiving signals via a wireless channel. For example, the wireless communication unit 210 performs the function of conversion between a baseband signal and bit stream according to the system physical layer specifications. During data transmission, the wireless communication unit 210 encodes and modulates a transmission bit stream, thereby generating complex symbols. Further, during data reception, the wireless communication unit 210 reconstructs the reception bit stream by demodulating and decoding the baseband signal.

The wireless communication unit 210 up-converts the baseband signal into an RF band signal and transmits the converted signal via an antenna, and the wireless communication unit 210 down-converts the RF band signal received via an antenna into a baseband signal.

The wireless communication unit 210 may include a transmission filter, a reception filter, an amplifier, a mixer, an oscillator, a digital-to-analog converter (DAC), and an analog-to-digital converter (ADC). The wireless communication unit 210 may include multiple transmission/reception paths. Further, the wireless communication unit 210 may include at least one antenna array constituted of multiple antenna elements.

In terms of hardware, the wireless communication unit 210 may be configured of a digital unit or analog unit, and the analog unit may include multiple sub units depending on the operation power and operation frequency. The digital unit may be implemented as at least one processor (e.g., a digital signal processor (DSP)).

The wireless communication unit 210 transmits and receives signals as described above. Thus, the whole or part of the wireless communication unit 210 may be referred to as a transmitter, a receiver, a transmitter/receiver, or a transceiver. Further, transmission and reception performed via a wireless channel in the following description may also include performing the above-described process by the wireless communication unit 210.

The backhaul communication unit 220 provides an interface for performing communication with other nodes in the network. The backhaul communication unit 220 may convert the bit string transmitted from the BS to another node, e.g., another access node, another BS, an upper node, or a core network, into a physical signal and convert the physical signal received from another node into a bit stream.

The storage unit 230 stores a basic program for operating the BS, application programs, configuration information, or other data. The storage unit 230 may include volatile memory, non-volatile memory, or a combination of volatile and non-volatile memories. The storage unit 230 provides the stored data according to a request from the controller 240.

The controller 240 performs the overall operation of the BS. For example, the controller 240 transmits and receives signals through the wireless communication unit 210 or through the backhaul communication unit 220. The controller 240 records and reads data in/from the storage unit 230. The controller 240 may perform functions of a protocol stack as set forth in the communication specifications. Alternatively, the protocol stack may be included in the wireless communication unit 210. The controller 240 may include at least one processor.

Although FIG. 2 illustrates the BS being implemented with separate units, i.e., the wireless communication unit 210, the backhaul communication unit 220, the storage unit 230, and the controller 240, at least two of the wireless communication unit 210, the backhaul communication unit 220, the storage unit 230, and the controller 240 may be integrated. The BS may also be implemented with at least one processor.

Figure 3:
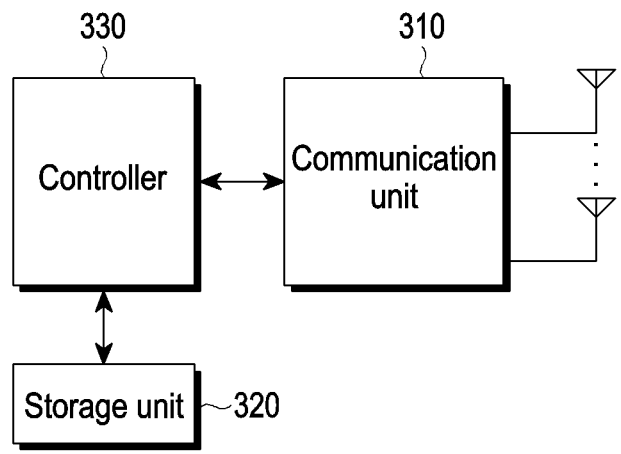
FIG. 3 illustrates an internal structure of a UE in a wireless communication system according to an embodiment.

FIG. 3 illustrates a UE in a wireless communication system according to an embodiment. For example, the UE 120 of FIG. 1 may be configured as illustrated in FIG. 3.

Referring to FIG. 3, the UE includes a communication unit 310, a storage unit 320, and a controller 330.

The communication unit 310, e.g., a transceiver, performs functions to transmit/receive signals via a wireless channel. For example, the communication unit 310 performs a conversion function between a baseband signal and bit stream according to the system physical layer specifications. During data transmission, the communication unit 310 encodes and modulates a transmission bit stream, thereby generating complex symbols. Further, during data reception, the communication unit 310 reconstructs the reception bit stream by demodulating and decoding the baseband signal. The communication unit 310 up-converts the baseband signal into an RF band signal and transmits the converted signal via an antenna, and the communication unit 5410 down-converts the RF band signal received via an antenna into a baseband signal. The communication unit 310 may include a transmission filter, a reception filter, an amplifier, a mixer, an oscillator, a DAC, and an ADC.

The communication unit 310 may include multiple transmission/reception paths. Further, the communication unit 310 may include at least one antenna array including multiple antenna elements.

In terms of hardware, the communication unit 310 may be configured of a digital circuit and an analog circuit (e.g., an RF integrated circuit (RFIC)). The digital circuit and analog circuit may be implemented in a single package. The communication unit 310 may include multiple RF chains. Further, the communication unit 310 may perform beamforming.

The communication unit 310 transmits and receives signals as described above. Thus, the whole or part of the communication unit 310 may be referred to as a transmitter, a receiver, a transmitter/receiver, or a transceiver. Further, transmission and reception performed via a wireless channel in the following description may also include performing the above-described process by the communication unit 310.

The storage unit 320 stores a basic program for operating the UE, application programs, configuration information, or other data. The storage unit 320 may include volatile memory, non-volatile memory, or a combination of volatile and non-volatile memories. The storage unit 320 provides the stored data according to a request from the controller 330.

The controller 330 performs the overall operation of the UE. For example, the controller 330 transmits and receives signals via the communication unit 310. The controller 330 records and reads data in/from the storage unit 320. The controller 330 may perform the functions of the protocol stack as set forth in the communication specifications. The controller 330 may include at least one processor or microprocessor or may be part of a processor. Part of the communication unit 310 and the controller 330 may be referred to as a communication processor.

Although FIG. 3 illustrates the UE being implemented with separate units, i.e., the communication unit 310, the storage unit 320, and the controller 330, at least two of the communication unit 310, the storage unit 320, and the controller 330 may be integrated. Further, the UE may be implemented with at least one processor.

Figure 4:
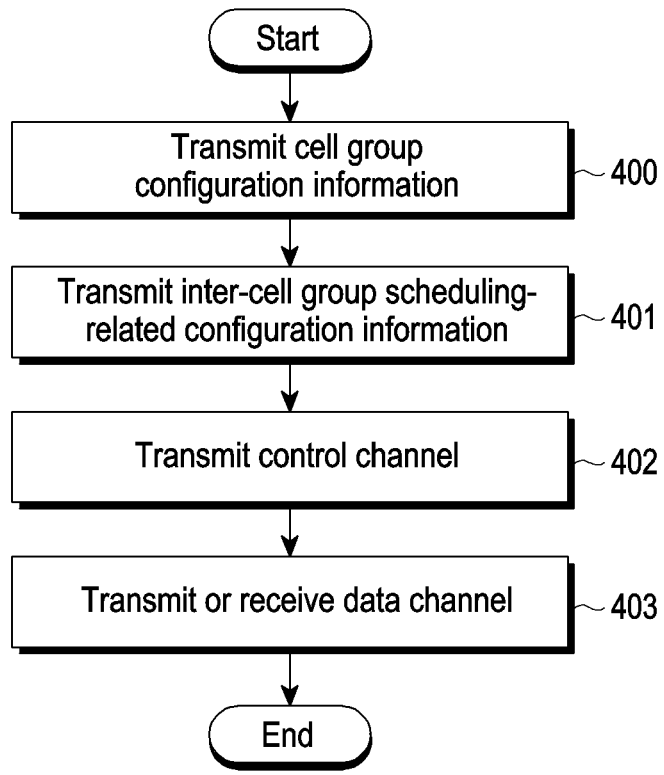
FIG. 4 is a flowchart illustrating a method of a BS for scheduling between cell groups in a wireless communication system according to an embodiment.

FIG. 4 is a flowchart illustrating a method of a BS for scheduling between cell groups in a wireless communication system according to an embodiment.

Referring to FIG. 4, in step 400, the BS transmits cell group configuration information, which is configuration information related to the cell group, to the UE.

In step 401, the BS additionally transmits inter-cell group scheduling-related configuration information, which is configuration information related to scheduling between cell groups, to the UE.

In step 402, the BS transmits a DL control channel signal including scheduling information about any signal/channel or data channel based on the scheduling-related configuration information. According to the scheduling-related configuration information, the DL control channel signal may be transmitted from a cell in the cell group where the data channel signal is actually scheduled and transmitted or from a cell in another cell group, not the cell group where the data channel signal is actually scheduled and transmitted.

In step 403, the BS transmits, to the UE, or receives, from the UE, the data channel signal or any signal/channel signal based on the scheduling-related configuration information.

Figure 5:
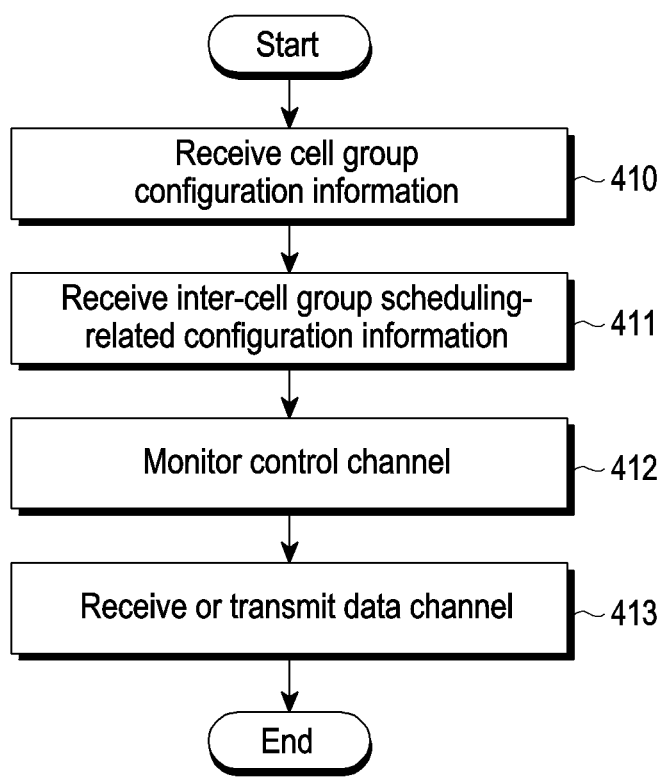
FIG. 5 is a flowchart illustrating a method of a UE for scheduling between cell groups in a wireless communication system according to an embodiment.

FIG. 5 is a flowchart illustrating a method of a UE for scheduling between cell groups in a wireless communication system according to an embodiment.

Referring to FIG. 5, in step 410, the UE receives, from the BS, cell group configuration information.

In step 411, the UE additionally receives inter-cell group scheduling-related configuration information, which is related to scheduling between cell groups, from the BS.

In step 412, the UE monitors the DL control channel based on the scheduling-related configuration information received from the BS. The UE may monitor the DL control channel from a cell in the cell group where the data channel signal is actually scheduled and transmitted based on the scheduling-related configuration information or monitor the DL control channel from a cell in a cell group other than the cell in the cell group where the data channel signal is actually scheduled and transmitted.

In step 413, the UE receives, from the BS, or transmits, to the BS, any signal/channel signal or the data channel signal based on the scheduling information included in the DL control information (DCI) received through the DL control channel.

Figure 6:
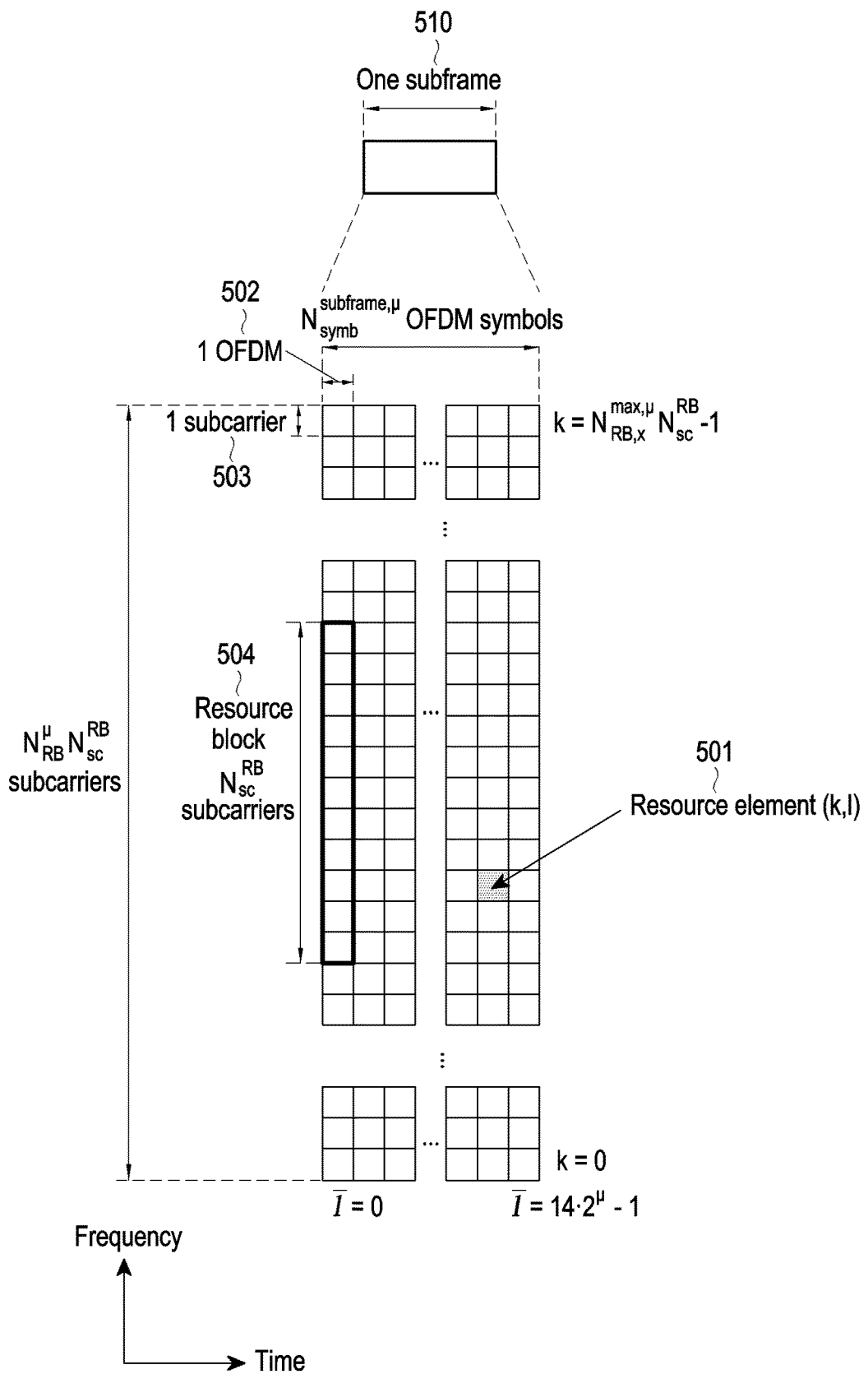
FIG. 6 illustrates a resource structure of a wireless communication system according to an embodiment.

FIG. 6 illustrates a resource structure of a wireless communication system according to an embodiment. Specifically, FIG. 6 illustrates a basic structure of a time-frequency domain, which is a radio resource region in which data or control channel signals are transmitted in a 5G system.

Referring to FIG. 6, the horizontal axis refers to the time domain, and the vertical axis refers to the frequency domain. A basic unit of a resource in the time and frequency domain is a resource element (RE) 501, which may be defined by one OFDM symbol 502 on the time axis, and by one subcarrier 503 on the frequency axis. In the frequency domain $N_{SC}^{RB}$ (e.g., 12) consecutive REs may constitute one resource block (RB) 504.

In FIG. 6, $N_{symb}^{subframe,\mu}$ is the number of OFDM symbols per subframe 510 for subcarrier spacing (SCS) setting (μ), e.g., as described in TS 38.211 section 4 standard.

Figure 7:
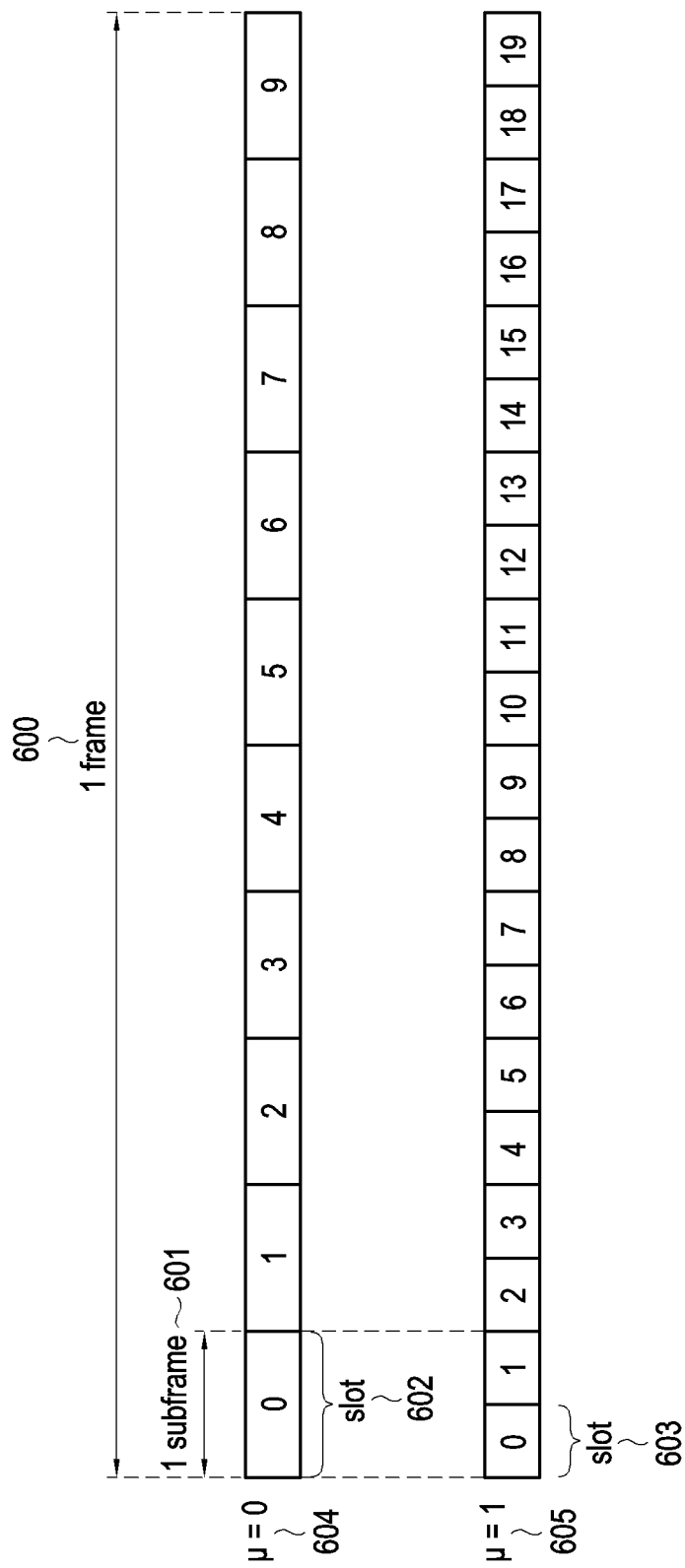
FIG. 7 illustrates a resource structure of a wireless communication system according to an embodiment.

FIG. 7 illustrates a resource structure of a wireless communication system according to an embodiment. Specifically, FIG. 7 illustrates an example of a slot structure considered in the 5G system.

Referring to FIG. 7, a frame 600 may be defined as, e.g., 10 ms, and one subframe 601 may be defined as, e.g., 1 ms. Thus, the frame 600 includes a total of 10 subframes 601.

A slot, e.g., each of the slots 602 and 603, may be defined as 14 OFDM symbols (i.e., the number ($N_{symb}^{slot}$) of symbols per one slot is 14 ($N_{symb}^{slot}$=14)). One subframe 601 may be composed of one or more slots 602 and 603, and the number of slots 602 and 603 per subframe 601 may differ depending on μ (604 or 605), which is a set value for the SCS.

FIG. 7 illustrates an example in which the SCS setting value μ=0 (604) and an example in which the SCS setting value μ=1 (605). For example, when μ=0 (604), one subframe 601 includes one slot 602, and when μ=1 (605), one subframe 601 includes two slots 603. According to the setting value p for SCS, the number ($N_{slot}^{subframe,\mu}$) of slots per subframe may vary, and accordingly, the number ($N_{slot}^{frame,\mu}$) of slots per frame may differ. $N_{slot}^{subframe,\mu}$ and $N_{slot}^{frame,\mu}$ according to each SCS setting value μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Figure 8:
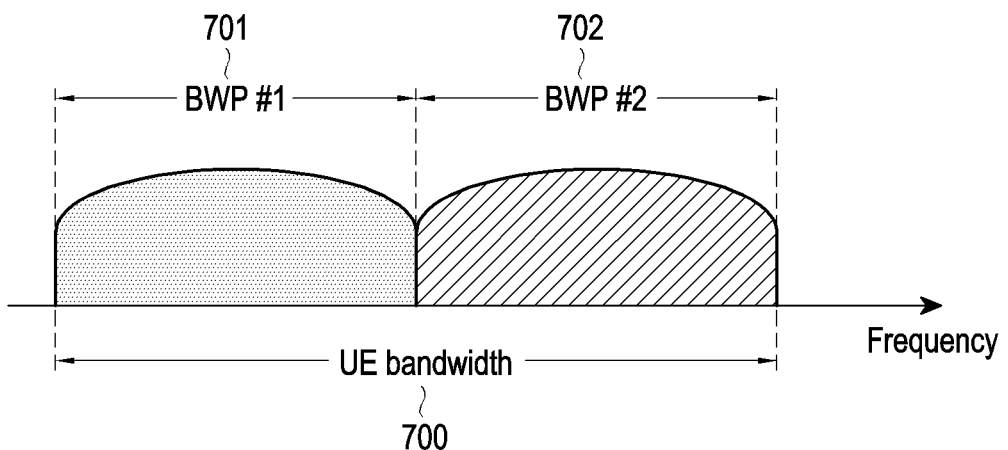
FIG. 8 illustrates a bandwidth part (BWP) in a wireless communication system according to an embodiment.

FIG. 8 illustrates a BWP in a wireless communication system according to an embodiment. Specifically, FIG. 8 illustrates an example of a configuration for a BWP in a 5G communication system.

Referring to FIG. 8, a UE bandwidth 700 is divided into two BWPs, e.g., BWP #1 701 and BWP #2 702. The BS may configure one or more BWPs in the UE and may configure information as shown in Table 2 below, for each BWP.

TABLE 2

| BWP ::= | SEQUENCE { | |
|---|---|---|
| bwp-id | | BWP-Id, |
| (Bandwidth part identifier) | | |
| locationAndBandwidth | | INTEGER (1..65536), |
| (Bandwidth part location) | | |
| subcarrierSpacing | | ENUMERATED {n0, n1, n2, n3, n4, n5}, |

TABLE 2-continued

| (Subcarrier spacing) | | |
|---|---|---|
| cyclicPrefix | | ENUMERATED { extended } |
| (Cyclic prefix) | | |
| } | | |

In Table 2, "locationAndBandwidth" denotes the position and bandwidth in the frequency domain of the corresponding BWP, "cyclicPrefix" denotes whether an extended cyclic prefix (CP) is used for the BWP, and "subcarrierSpacing" denotes the SCS to be used in the BWP.

Various embodiments are not limited to the examples described above, and in addition to the configuration information described above, various parameters related to the BWP may be configured in the UE. The above-described information may be delivered by the BS to the UE through higher layer signaling, e.g., radio resource control (RRC) signaling. At least one BWP among one or more configured BWPs may be activated. Whether to activate the configured BWPs may be transferred from the BS to the UE semi-specifically through RRC signaling or dynamically through DCI.

An initial BWP for initial access for the UE, before an RRC connection, may be configured by the BS through a master information block (MIB). Specifically, the UE may receive configuration information about the search space and a CORESET in which a physical DL control channel (PDCCH) signal may be transmitted for receiving system information (SI) (which may correspond to remaining SI (RMSI) or an SI block (SIB) 1) for initial access via the MIB in the initial access phase. Each of the CORESET and a search space configured through the MIB may be regarded as an identifier (or identity (ID) 0. For example, the CORESET and the search space configured through the MIB may be a common CORESET and a common search space, respectively. The BS may provide the UE with configuration information, such as frequency allocation information, time allocation information, and numerology for CORESET #0, via the MIB. Further, the BS may provide the UE with configuration information about paging occasion and monitoring period for CORESET #0, i.e., configuration information about search space #0, via the MIB. The UE may regard the frequency range configured as CORESET #0 obtained through the MIB, as the initial BWP for initial access. In this case, the ID of the initial BWP may be regarded as 0.

The configuration of the BWP supported in 5G may be used for various purposes.

A case that the bandwidth supported by the UE is smaller than the system bandwidth may be supported through the BWP configuration. For example, as the BS configures the UE with the frequency position of the BWP, the UE may transmit/receive data in a specific frequency position in the system bandwidth.

In supporting different numerologies, the BS may configure the UE with a plurality of BWPs. For example, to support data transmission/reception using an SCS of 15 kHz and an SCS of 30 kHz for some UE, the BS may configure the UE with two bandwidths, as SCSs of 15 kHz and 30 kHz. The different BWPs may be frequency division multiplexed and, when data is transmitted/received at a specific SCS, the BWP configured as the SCS may be activated.

To reduce power consumption of the UE, the BS may configure the UE with BWPs having different sizes of bandwidths. For example, when the UE supports a bandwidth exceeding an exceptionally large bandwidth, e.g., a bandwidth of 100 MHz, and always transmits/receives data using the bandwidth, significant power consumption may occur. In particular, it is very inefficient in terms of power consumption to monitor an unnecessary DL control channel using a large bandwidth of 100 MHz when there is no traffic.

Therefore, to reduce power consumption of the UE, the BS may configure a BWP of a relatively small bandwidth to the UE, e.g., a BWP of 20 Mhz, in the UE. When there is no traffic, the UE may perform a monitoring operation in the 20 MHz BWP, and when data is generated, the UE may transmit and receive data using a BWP of 100 MHz according to an instruction from the BS.

In a method for configuring a BWP, UEs, before being RRC connected, may receive configuration information about an initial bandwidth via an MIB in the initial access phase. Specifically, for the UE, a CORESET for a DL control channel through which DCI for scheduling an SIB may be transmitted from the MIB of a physical broadcast channel (PBCH) may be configured. The bandwidth of the CORESET configured via the MIB may be regarded as the initial BWP, and the UE may receive the SIB in a physical DL shared channel (PDSCH). The initial BWP may be utilized for other SI (OSI), paging, and random access (RA) as well as for receiving SIB.

If the UE is configured with one or more BWPs, the BSs may instruct the UE to change the BWP using the BWP indicator field in the DCI. For example, when the currently activated BWP of the UE is BWP #1 701 in FIG. 8, the BS may indicate, to the UE, BWP #2 702 using the BWP indicator in the DC, and the UE may change the BWP to BWP #2 702, indicated by the BWP indicator in the received DCI.

As described above, since DCI-based BWP changing may be indicated by the DCI scheduling PDSCH or physical UL shared channel (PUSCH), the UE, if receiving a BWP change request, should be able to receive or transmit the PDSCH signal or PUSCH signal, scheduled by the DC, in the changed BWP.

The standard specified requirements for delay time $T_{BWP}$ required upon changing BWP may be represented as shown in Table 3 below.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1
Depends on UE capability.
Note 2
If the BWP switch involves changing of SCS, the BWP switch delay is determined by the larger one between the SCS before BWP switch and the SCS after BWP switch.

The requirement for delay of BWP change supports type 1 or type 2 according to the capability of the UE. The UE may report a supportable BWP delay time type to the BS.

If the UE receives, in slot n, DCI including a BWP change indicator according to the above-described requirements for BWP change delay time, the UE may complete a change to the new BWP, indicated by the BWP change indicator, at a time no later than slot n+$T_{BWP}$, and may perform transmission/reception on the data channel scheduled by the DCI in the changed, new BWP. Upon scheduling data channel in the new BWP, the BS may determine time domain resource allocation (TDRA) for data channel considering the UE's BWP change delay time $T_{BWP}$. In other words, in determining the TDRA for a data channel when scheduling data channel with the new BWP, the BS may schedule a time after the BWP change delay, for the data channel. Thus, the UE may not expect that the DCI indicating the BWP change indicates a slot offset (K0 or K2) smaller than the BWP change delay time $T_{BWP}$.

If the UE receives DCI (e.g., DCI format 1_1 or 0_1) indicating a BWP change, the UE may not perform a transmission or reception during a time interval from the third symbol of the slot when the PDCCH including the DCI is received to the start time of the slot indicated as the slot offset (K0 or K2) indicated in the TDRA indicator field in the DCI. For example, if the UE receives the DCI indicating a BWP change in slot n, and the slot offset value indicated by the DCI is K, the UE may not perform a transmission or reception from the third symbol of slot n to a symbol before slot n+K (i.e., the last symbol of slot n+K−1).

An synchronization signal (SS)/PBCH block is a physical layer channel block including a primary SS (PSS), a secondary SS (SSS), and a PBCH. The SS/PBCH block may also be referred to as a synchronization signal block (SSB).

Specifically, the configuration of the SS/PBCH block is as follows.

PSS: A signal that serves as a reference for DL time/frequency synchronization and provides part of the information about cell ID SSS: serves as a reference for DL time/frequency synchronization, and provides the remaining information about cell ID, which the PSS does not provide. Additionally, the SSS may serve as a reference signal for demodulation of PBCH.

PBCH: provides essential SI for transmitting and receiving a data channel and control channel signal by the UE. The essential SI may include search space-related control information indicating radio resource mapping information about the control channel and scheduling control information regarding a separate data channel for transmitting SI.

The SS/PBCH block may include a combination of PSS, SSS, and PBCH. One or more SS/PBCH blocks may be transmitted within, e.g., 5 ms, and each transmitted SS/PBCH block may be distinguished with an index.

The UE may detect the PSS and SSS in the initial access phase and may decode the PBCH. The UE may obtain the MIB from the PBCH and, therefrom, CORESET #0 (which may correspond to the CORESET where the CORESET index or ID is 0) and search space #0 (which may correspond to the search space where the search space index or ID is 0) may be configured. The UE may perform monitoring on CORESET #0, assuming that the selected SS/PBCH block and the demodulation reference signal (DMRS) transmitted in CORESET #0 are quasi-co-located (QCLed). The UE may receive SI based on DCI transmitted in CORESET #0.

The UE may obtain configuration information related to an RA channel (RACH) required for initial access from the received SI. The UE may transmit the physical RACH (PRACH) signal to the BS considering the selected SS/PBCH index, and the BS receiving the PRACH signal may obtain information about the SS/PBCH block index selected by the UE. The BS may know which SS/PBCH block the UE has selected from the SS/PBCH blocks and that the UE is monitoring CORESET #0 related thereto.

Scheduling information about UL data (or a PUSCH) or DL data (or a PDSCH) in the 5G system is transmitted from the BS through DCI to the UE. The UE may monitor the DCI format for fallback and the DCI format for non-fallback for a PUSCH or a PDSCH. The fallback DCI format may include fixed fields predefined between the BS and the UE, and the non-fallback DCI format may include configurable fields.

DCI may be transmitted through the PDCCH, which is a PDCCH, via channel coding and modulation. A cyclic redundancy check (CRC) may be added to the DCI message payload, and the CRC may be scrambled with a radio network temporary identifier (RNTI) of the UE. Different RNTIs may be used for the purposes of the DCI message, e.g., UE-specific data transmission, power control command, or RA response. In other words, the RNTI might not be explicitly transmitted, but the RNTI is included in the CRC calculation process and transmitted. Upon receiving the DCI transmitted on the PDCCH, the UE identifies the CRC using the allocated RNTI, and when the CRC is correct, the UE may be aware that the DCI has been transmitted to the UE.

DCI scheduling a PDSCH for SI may be scrambled to SI-RNTI. DCI scheduling a PDSCH for an RA response (RAR) message may be scrambled to RA-RNTI. DCI scheduling a PDSCH for a paging (P) message may be scrambled with P-RNTI. DCI providing a slot format indicator (SFI) may be scrambled to SFI-RNTI. DCI providing transmit power control (TPC) may be scrambled to TPC-RNTI. DCI scheduling a UE-specific PDSCH or PUSCH may be scrambled with the cell RNTI (C-RNTI), modulation coding scheme C-RNTI (MCS-C-RNTI), or configured scheduling RNTI (CS-RNTI).

DCI format 0_0 may be used as fallback DCI for scheduling a PUSCH, and in this case, a CRC may be scrambled to C-RNTI. DCI format 0_0 in which a CRC is scrambled to C-RNTI may include, e.g., the information shown in Table 4 below.

TABLE 4

Identifier for DCI formats - 1 bit
    The value of this bit field is always set to 0, indicating an UL DCI format
Frequency domain resource assignment - $\lceil \log_2(N_{RB}^{UL,BWP}(N_{RB}^{UL,BWP} + 1)/2) \rceil$ bits where $N_{RB}^{UL,BWP}$ is defined in subclause 7.3.1.0
    For PUSCH hopping with resource allocation type 1:
        $N_{UL\_hop}$ MSB bits are used to indicate the frequency offset according to Subclause 6.3 of [6, TS 38.214], where $N_{UL\_hop}$ = 1 if the higher layer parameter frequencyHoppingOffsetLists contains two offset values and $N_{UL\_hop}$ = 2 if the higher layer parameter frequencyHoppingOffsetLists contains four offset values
        $\lceil \log_2(N_{RB}^{UL,BWP}(N_{RB}^{UL,BWP} + 1)/2) \rceil$ - $N_{UL\_hop}$ bits provides the frequency domain resource allocation according to Subclause 6.1.2.2.2 of [6,TS 38.214]
    For non-PUSCH hopping with resource allocation type 1:
        $\lceil \log_2(N_{RB}^{UL,BWP}(N_{RB}^{UL,BWP} + 1)/2) \rceil$ bits provides the frequency domain resource allocation according to Subclause 6.1.2.2.2 of [6, TS 38.214]
Time domain resource assignment - 4 bits as defined in Subclause 6.1.2.1 of [6, TS 38.214]
Frequency hopping flag - 1 bit according to Table 7.3.1.1.1-3, as defined in Subclause 6.3 of [6, TS 38.214]
Modulation and coding scheme - 5 bits as defined in Subclause 6.1.4.1 of [6, TS 38.214]
New data indicator - 1 bit
Redundancy version - 2 bits as defined in Table 7.3.1.1.1-2
HARQ process number - 4 bits
TPC command for scheduled PUSCH - 2 bits as defined in Subclause 7.1.1 of [5, TS 38.213]
Padding bits, if required.
UL/SUL indicator - 1 bit for UEs configured with supplementaryUplink in ServingCellConfig in the cell as defined in Table 7.3.1.1.1-1 and the number of bits for DCI format 1_0 before padding is larger than the number of bits for DCI format 0_0 before padding; 0 bit otherwise. The UL/SUL indicator, if present, locates in the last bit position of DCI format 0_0, after the padding bit(s).
    If the UL/SUL indicator is present in DCI format 0_0 and the higher layer parameter pusch -Config is not configured on both UL and SUL the UE ignores the UL/SUL indicator field in DCI format 0_0, and the corresponding PUSCH scheduled by the DCI format 0_0 is for the UL or SUL for which high layer parameter pucch-Config is configured;
    If the UL/SUL indicator is not present in DCI format 0_0 and pucch-Corifig is configured, the corresponding PUSCH scheduled by the DCI format 0_0 is for the UL or SUL for which high layer parameter pucch-Config is configured.
    If the UL/SUL indicator is not present in DCI format 0_0 and pucch-Config is not configured, the corresponding PUSCH scheduled by the DCI format 0_0 is for the uplink on which the latest PRACH is transmitted.

DCI format 0_1 may be used as non-fallback DCI for scheduling a PUSCH, and in this case, a CRC may be scrambled to C-RNTI. DCI format 0_1 in which a CRC is scrambled to C-RNTI may include, e.g., the information shown in Tables 5A to 5D below. Tables 5A to 5D show a series of fields (information) included in DCI format 0_1 separated for convenience.

TABLE 5A

Identifier for DCI formats - 1 bit
    The value of this bit field is always set to 0, indicating an UL DCI format
Carrier indicator - 0 or 3 bits, as defined in Subclause 10.1 of [5, TS38.213].
UL/SUL indicator - 0 bit for UEs not configured with supplementaryUplink in ServingCellConfig in the cell or UEs configured with supplementaryUplink in ServingCellConfig in the cell but only PUCCH carrier in the cell is configured for PUSCH transmission; otherwise, 1 bit as defined in Table 7.3.1.1.1-1.

TABLE 5A-continued

Bandwidth part indicator - 0, 1 or 2 bits as determined by the number of UL BWPs $n_{BWP,RRC}$ configured by higher layers, excluding the initial UL bandwidth part. The bitwidth for this field is determined as $\lceil \log_2(n_{BWP}) \rceil$ bits, where $n_{BWP} = n_{BWP,RRC} + 1$ if $n_{BWP,RRC} \leq 3$, in which case the bandwidth part indicator is equivalent to the ascending order of the higher layer parameter BWP-Id;

otherwise $n_{BWP} = n_{BWP,RRC}$, in which case the bandwidth part indicator is defined in Table 7.3.1.1.2-1;

if a UE does not support active BWP change via DCI, the UE ignores this bit field.

Frequency domain resource assignment - number of bits determined by the following, where $N_{RB}^{UL,BWP}$ is the size of the active UL bandwidth part:

$N_{RBG}$ bits if only resource allocation type 0 is configured, where $N_{RBG}$ is defined in Subclause 6.1.2.2.1 of [6, TS 38.214], $\lceil \log_2(N_{RB}^{UL,BWP}(N_{RB}^{UL,BWP} + 1)/2) \rceil$ bits if only resource allocation type 1 is configured, or $\max(\lceil \log_2(N_{RB}^{UL,BWP}(N_{RB}^{UL,BWP} + 1)/2) \rceil, N_{RBG}) + 1$ bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

For resource allocation type 0, the $N_{RBG}$ LSBs provide the resource allocation as defined in Subclause 6.1.2.2.1 of [6, TS 38.214].

For resource allocation type 1, the $\lceil \log_2(N_{RB}^{UL,BWP}(N_{RB}^{UL,BWP} + 1)/2) \rceil$ LSBs provide the resource allocation as follows:

For PUSCH hopping with resource allocation type 1:

$N_{UL\_hop}$ MSB bits are used to indicate the frequency offset according to Subclause 6.3 of [6, TS 38.214], where $N_{UL\_hop} = 1$ if the higher layer parameter frequencyHoppingOffsetLists contains two offset values and $N_{UL\_hop} = 2$ if the higher layer parameter frequencyHoppingOffsetLists contains four offset values $\lceil \log_2(N_{RB}^{UL,BWP}(N_{RB}^{UL,BWP} + 1)/2) \rceil - N_{UL\_hop}$ bits provides the frequency domain resource allocation according to Subclause 6.1.2.2.2 of [6, TS 38.214]

For non-PUSCH hopping with resource allocation type 1:

$\lceil \log_2(N_{RB}^{UL,BWP}(N_{RB}^{UL,BWP} + 1)/2) \rceil$ bits provides the frequency domain resource allocation according to Subclause 6.1.2.2.2 of [6, TS 38.214]

If "Bandwidth part indicator" field indicates a bandwidth part other than the active bandwidth part and if both resource allocation type 0 and 1 are configured for the indicated bandwidth part, the UE assumes resource allocation type 0 for the indicated bandwidth part if the bitwidth of the "Frequency domain resource

TABLE 5B assignment" field of the active bandwidth part is smaller than the bitwidth of the "Frequency domain resource assignment" field of the indicated bandwidth part.

Time domain resource assignment - 0, 1, 2, 3, or 4 bits as defined in Subclause 6.1.2 of [6, TS38.214]. The bitwidth for this field is determined as $\lceil \log_2(I) \rceil$ bits, where I is the number of entries in the higher layer parameter pusch-TimeDomeAllocationList if the higher layer parameter is configured; otherwise 1 is the number of entries in the default table, Frequency hopping flag - 0 or 1 bit:

0 bit if only resource allocation type 0 is configured or if the higher layer parameter frequencyHopping is not configured;

1 bit according to Table 7.3.1.1.1-3 otherwise, only applicable to resource allocation type 1, as defined in Subclause 6.3 of [6. TS 38.214].

Modulation and coding scheme - 5 bits as defined in Subclause 6.1.4.1 of [6, TS 38.214]

New data indicator - 1 bit

Redundancy version - bits as defined in Table 7.3.1.1.1-2

HARQ process number - 4 bits

1st downlink assignment index - 1 or 2 bits:

1 bit for semi-static HARQ-ACK codebook;

2 bits for dynamic HARQ-ACK codebook.

2nd downlink assignment index - 0 or 2 bits:

2 bits for dynamic HARQ-ACK codebook with two HARQ-ACK sub-codebooks;

0 bit otherwise.

TPC command for scheduled PUSCH - 2 bits as defined in Subclause 7.1.1 of [5, TS38.213]

SRS resource indicator - $\left\lceil \log_2\left( \sum_{k=1}^{\min\{L_{max}, N_{SRS}\}} \binom{N_{SRS}}{k} \right) \right\rceil$ or $\lceil \log_2(N_{SRS}) \rceil$ bits, where $N_{SRS}$ is the number of configured SRS resources in the SRS resource set associated with the higher layer parameter usage of value 'codeBook' or 'nonCodeBook', $\left\lceil \log_2\left( \sum_{k=1}^{\min\{L_{max}, N_{SRS}\}} \binom{N_{SRS}}{k} \right) \right\rceil$ bits according to Tables 7.3.1.1.2-28/29/30/31 if the higher layer parameter txConfig = nonCodebook, where $N_{SRS}$ is the number of configured SRS resources in the SRS resource set associated with the higher layer parameter usage of value 'nonCodeBook' and

TABLE 5B-continued if UE supports operation with maxMIMO-Layers and the higher layer parameter maxMIMO-Layers of PUSCH-ServingCellConfig of the serving cell is configured, $L_{max}$ is given by that parameter otherwise, $L_{max}$ is given by the maximum number of layers for PUSCH supported by the UE for the serving cell for non-codebook based operation.

$\lceil \log_2(N_{SRS}) \rceil$ bits according to Tables 7.3.1.1.2-32 if the higher layer parameter txConfig = codebook, where $N_{SRS}$ is the number of configured SRS resources in the SRS resource set associated with the higher layer parameter usage of value 'codeBook'.

Precoding ininformation and number of layers - number of bits determined by the following:
0 bits if the higher layer parameter txConfig = nonCodeBook;
0 bits for 1 antenna port and if the higher layer parameter txConfig = codebook;

TABLE 5C 4, 5, or 6 bits according to Table 7.3.1.1.2-2 for 4 antenna ports. if txConfig = codebook, and according to whether transform precoder is enabled or disabled, and the values of higher layer parameters maxRank, and codebookSubset;

2, 4, or 5 bits according to Table 7.3.1.1.2-3 for 4 antenna ports. if txConfig = codebook, and according to whether transform precoder is enabled or disabled, and the values of higher layer parameters maxRank, and codebookSubset;

2 or 4 bits according to Table 7.3.1.1.2-4 for 2 antenna ports if txConfig = codebook; and according to whether transform precoder is enabled or disabled, and the values of higher layer parameters maxRank and codebookSubset;

1 or 3 bits according to Table 7.3.1.1.2-5 for 2 antenna ports, if txConfig = codebook; and according to whether transform precoder is enabled or disabled, and the values of higher layer parameters maxRank and codebookSubset.

Antenna ports - number of bits determined by the following
2 bits as defined by Tables 7.3.1.1.2-6, if transform precoder is enabled, dmrs-Type = 1, and maxLength = 1;
4 bits as defined by Tables 7.3.1.1.2-7, if transform precoder is enabled, dmrs-Type = 1, and maxLength-2;
3 bits as defined by Tables 7.3.1.1.2-8/9/10/11., if transform precoder is disabled, dmrs-Type = 1, and maxLength = 1, and the value of rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-12/1.3/14/15, if transform precoder is disabled, dmrs-Type = 1, and maxLength = 2, and the value of rank is determined according to the SRS resource indicator field if the higher layer parameter txConfig = nonCodebook and according to the Precoding information and number of layers field if the higher layer parameter txConfig = codebook;
4 bits as defined by Tables 7.3.1.1.2-16/17/18/19, if transform precoder is disabled, dmrs-Type maxLength = 1, and the value of rank is determined according to the SRS resource indicator field if the higher layer parameter txConfig = nonCodebook according to the Precoding information and number of layers field if the higher layer parameter txConfig = codebook;
5 bits as defined by Tables 7.3.112-20/21/22/23, if transform precoder is disabled, dmrs-Type = 2, and maxLength = 2, and the value of rank is determined according to the SRS resource indicator field if the higher layer parameter txConfig = nonCodebook and according to the Precoding information and number of layers field if the higher layer parameter txConfig = codebook.
where the number of CDM groups without data of values 1.2, and 3 in Tables 7.3.1.1.2-6 to 7.3.1.1.2-23 refers to CDM groups $\{0\}$ $\{0, 1\}$ and $\{0, 1, 2\}$ respectively.
If a UE is configured with both dmrs-UplinkForPUSCH-MappingTypeA and dmrs-UplinkForPUSCH-MappingTypeB, the bitwidth of this field equals max $\{x_A, x_B\}$, where $x_A$ is the "Antenna ports" bitwidth derived according to dmrs-UplinkForPUSCH-MappingTypeA and $x_B$ is the "Antenna ports" bitwidth derived according to dmrs-UplinkForPUSCH-MappingTypeB. A number of $|x_A - x_B|$ zeros are padded in the MSB of this field, if the mapping type of the PUSCH corresponds to the smaller value of $x_A$ and $x_B$.
SRS request - 2 bits as defined by Table 7.3.1.1.2-24 for UEs not configured with supplementaryUplink in Servin-CellConfig in the cell; 3 bits for UEs configured with supplementaryUplink in ServingCellConfig in the cell where the first bit is the

TABLE 5D non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].

CSI request - 0, 1, 2, 3, 4, 5, or 6 bits determined by higher layer parameter reportTriggerSize.

CBG transmission information (CBGTO) - 0 bit if higher layer parameter codeBlockGroupTransmission for PDSCH is not configured, otherwise, 2, 4, 6, or 8 bits determined by higher layer parameter maxCodeBlockGroupsPerTransportB lock for PUSCH.

PERS-DMRS association - number of bits determined as follows 0 bit if PTRS-UplinkConfig is not configured and transform precoder is disabled, or if transform precoder is enabled, or if maxRank = 1;

TABLE 5D-continued 2 bits otherwise, where Table 7.3.1.1.2-25 and 7.3.1.1.2-26 are used to indicate the association between
  PTRS port(s) and DMRS port(s) for transmission of one PT-RS port and two PT-RS ports respectively,
  and the DMRS ports are indicated by the Antenna ports field.
If "Bandwidth part indicator" field indicates a bandwidth part other than the active bandwidth part and the
"PTRS-DNIRS association" field is present for the indicated bandwidth part but not present for the active
bandwidth part, the UE assumes the "PTRS-DMRS association" field is not present for the indicated
bandwidth part.
beta_offset indicator - 0 if the higher layer parameter betaOffsets = semiStatic, otherwise 2 bits as defined
by Table 9.3-3 in [5, TS 38.213].
DMRS sequence initialization - 0 bit if transform precoder is enabled, 1 bit transform precoder is disabled.
UL-SCH indicator - 1 bit. A value of "1" indicates UL-SCH shall be transmitted on the PUSCH and a value
of "0" indicates UL-SCH shall not be ttansmited on the PUSCH. Except for DCI format 0_1 with CRC
scrambled by SP-CSI-RNTI, a UE is not expected o receive a DCI format 0_1 with UL-SCH indicator of
"0" and CSI request of all zero(s).

[15]

DCI format 1_0 may be used as fallback DCI for scheduling a PDSCH, and in this case, a CRC may be scrambled to C-RNTI. DCI format 1-0 in which a CRC is scrambled to C-RNTI may include, e.g., the information shown in Table 6 below.

TABLE 6 identifier for DCI formats - 1 bits
  The value of this bit field is always set to 1, indicating a DL DCI format
  Frequency domain resource assignment - $\lceil \log_2 (N^{DL,BWP}_{RB}(N^{DL,BWP}_{RB} + 1)/2) \rceil$ bits where $N^{DL,BWP}_{RB}$ is
given
  by subclause 7.3.1.0
if the CRC of the DCI format 1_0 is scrambled by C-RNTI and the "Frequency domain resource assignment"
field are of all ones; the DCI format 1_0 is for random access procedure initiated by a PDCCH order, with all
remaining fields set as follows:
  Random Access Preamble index - 6 bits according to ra-PreambleIndex in Subclause 5.1.2 of [8, TS38.321]
  UL/SUL indicator - 1 bit. If the value of the "Random Access Preamble index" is not all zeros and if the
  UE is configured with supplementaryUplink in ServinaCellConfig in the cell, this field indicates which UL
  carrier in the cell to transmit the PRACH according to Table 7.3.1.1.1-1 otherwise, this field is reserved
  SS/PBCH index - 6 bits, if the value of the "Random Access Preamble index" is not all zeros, this field
  indicates the SS/PBCH that shall be used to determine the RACH occasion for the PRACH transmission;
  otherwise, this field is reserved.
  PRACH Mask index - 4 bits. If the value of the "Random Access Preamble index" is not all zeros, this field
  indicates the RACH occasion associated with the SS/PBCH indicated by "SS/PBCH index" for the PRACH
  transmission, according to Subclause 5.1.1 of [8. TS38.321]; otherwise, this field is reserved
  Reserved bits - 10 bits
Otherwise, all remaining fields are set as follows:
  Time domain resource assignment - 4 bits as defined in Subclause 5.1.2.1 of [6, TS 38.214]
  VRB-to-PRB mapping - 1 bit according to Table 7.3.1.2.2-5
  Modulation and coding scheme 0 5 bits as defined in Subclause 5.1.3 of [6, TS 28.214]
  New data indicator - 1 bit
  Redundancy version - 2 bits as defined in Table 7.3.1.1.1-2
  HARQ process number - 4 bits
  Downlink assignment index - 2 bits as defined in Subclause 9.1.3 of [5, TS 38.213], as counter DAI
  TPC command for scheduled PUCCH - 2 bits as defined in Subclause 7.2.1 of [5, TS 38.213]
  PUCCH resource indicator - 3 bits as defined in Subclause 9.2.3 of [5, TS 38.213]
  PDSCH-to-HARQ feedback timing indicator - 3 bits as defined in Subclause 9.2.3 of [5, TS 38.213]

DCI format 1_1 may be used as non-fallback DCI for scheduling a PDSCH, and in this case, a CRC may be scrambled to C-RNTI. DCI format 1_1 in which a CRC is scrambled to C-RNTI may include, e.g., the information shown in Tables 7A to 7C below. Tables 7A to 7C show a series of fields (information) included in DCI format 11 separated for convenience.

TABLE 7A

Identifier for DCI formats - 1 bits
  The value of this bit field is always set to 1, indicating a DL DCI format
Carrier indicator - 0 or 3 bits as defined in Subclause 10.1 of [5, TS 38.213].
Bandwidth part indicator - 0, 1 or 2 bits as determined by the number of DL BWPs $n_{BWP,RRC}$ configured by
higher layers, excluding the initial DL bandwidth part. The bitwidth for this field is determined as
$\lceil \log_2(n_{BWP,RRC}) \rceil$ bits, where
  $n_{BWP} = n_{BWP,RRC} + 1$ which case the bandwidth part indicator is equivalent to the
  ascending order of the higher layer parameter BWP-Id;
  otherwise $n_{BWP} = n_{BWP,RRC}$, in which case the bandwidth part indicator is defined in Table 7.3.1.1.2-1;

TABLE 7A-continued

If a UE does not support active BWP change via DCI, the UE ignores this bit field.
Frequency domain resource assignment - number of bits determined by the following, where $n^{DL,BWP}_{RB}$ is the size of the active DL bandwidth part:
  $N_{RGB}$ bits if only resource allocation type 0 is configured, where $N_{RGB}$ is defined in Subclause 5.1.2.2.1 of [6, TS38.214],
  $\lceil \log_2(N^{DL,BWP}_{RB}(N^{DL,BWP}_{RB} + 1)/2) \rceil$ bits if only resource allocation type 1 is configured, or
  $\max \lceil (\log_2(N^{DL,BWP}_{RB}(N^{DL,BWP}_{RB} + 1)/2) \rceil, N_{RBG}) + 1$ bits if both resource allocation type 0 and 1 are configured.
  If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.
  For resource allocation type 0, the $N_{RBG}$ LSBs provide the resource allocation as defined in Subclause 5.1.2.2.1 of [6, TS 38.214].
  For resource allocation type 1, the $\lceil \log_2(N^{DL,BWP}_{RB}(N^{DL,BWP}_{RB} + 1)/2) \rceil$ LSBs provide the resource allocation as defined in Subclause 5.1.2.2.2 of [6, TS 38.214]
If "Bandwidth part indicator" field indicates a bandwidth part other than the active bandwidth part and if both resource allocation type 0 and 1 are confnutred for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.
Time domain resource assignment - 0, 1, 2, 3, or 4 bits as defined in Subclause 5.1.2.1 of [6, TS 38.214]. The bitwidth for this field is determined as $\lceil \log_2(I) \rceil$ bits, where I is the number of entries in the higher layer parameter pdsch-TimeDomainAllocationList if the higher layer parameter is configured; otherwise I is the number of entties in the default table.
VRB-to-PRB mapping - 0 or 1 bit:
  0 bit if only resource allocation type 0 is configured or if interleaved VRB-to-PRB mapping is not configured by high layers;
  1 bit according to Table 7.3,1.2.2-5 otherwise, only applicable to resource allocation type 1, as defined in Subclause 7.3.1.6 of [4, TS 38.211].
PRB bundling size indicator - 0 bit if the higher layer parameter prb-BundlingType is not configured or is set to 'static', or 1 bit if the higher layer parameter prb-BundlingType is set to 'dynamic' according to Subclause 5.1.2.3 of [6, TS 38.214].

TABLE 7B

Rate matching indicator - 0, 1, or 2 bits according to higher layer parameters rateMatchPatternGroup1 and rateMatchPatternGroup2, where the MSB is used to indicate rateMatchPatternGroup1 and the LSB is used to indicate rateMatchPatternGroup2 when there are two groups.
ZP CSI-RS trigger - 0, 1, or 2 bits as defined in Subclause 5.1.4.2 of [6, TS 38.214]. The bitwidth for this field is determined as $\lceil \log_2 (n_{ZP} + 1) \rceil$ bits, where nZP is the number of aperiodic ZP CSI-RS resource sets configured by higher layer.
For transport block 1:
  Modulation and coding scheme - 5 bits as defined in Subclause 5.1.3.1 of [6, TS 38.214]
  New data indicator - 1 bit
  Redundancy version - 2 bits as defined in Table 7.3.1.1.1-2
For minsport block 2 (only present if maxNrofCodeWordsScheduledByDCI equals 2):
  Modulation and coding scheme - 5 bits as defined in Subclause 5.1.3.1 of [6, TS 38.214]
  New data indicator - 1 bit
Redundancy version - 2 bits as defined in Table 7.3.1.1.1-2
If "Bandwidth part indicator" field indicates a bandwidth part other than the active bandwidth part and the value of maxNrofCodeWordsScheduledByDCI for the indicated bandwidth part equals 2 and the value of maxNrofCodeWordsScheduledByDCI for the active bandwidth part equals 1, the UE assumes zeros are padded when interpreting the "Modulation and coding scheme", "New data indicator", and "Redundancy version" fields of transport block 2 according to Subclause 12 of [5, TS38.213], and the UE ignores the "Modulation and coding scheme", "New data indicator", and "Redundancy version" fields of transport block 2 for the indicated bandwidth part.
HARQ process number - 4 bits
Downlink assignment index - number of bits as defined in the following
  4 bits if more than one serving cell are configured in the DE, and the higher layer parameter pdsch-HARQ-ACK-Codebook = dynamic, where the 2 MSB bits are the counter DAI and the 2 LSB bits are the total DAI;
  2 bits if only one serving cell is configured in the DL and the higher layer patameter pdsch-HARQ-ACK-Codebook = dynamic, where the 2 bits are the counter DAI;
  0 bits otherwise.
TPC command for scheduled PUCCH - 2 bits as defined in Subclause 7.2.1 of [5, TS 38.213]
PUCCH resource indicator - 3 bits as defined in Subclause 9,2,3 of [5, TS 38.213]
PDSCH-to-HARQ feedback timing indicator - 0, 1, 2, or 3 bits as defined in Subclause 9.2.3 of [5, TS 38.213]. The bitwidth for this field is determined as $\lceil \log_2(I) \rceil$ bits, where I is the number of entries in the higher layer parameter dl-DataToUL-ACK.
Antenna port(s) - 4, 5, or 6 bits as defined by Tables 7.3.1.2.2-1/2/3/4, where the number of CDM groups without data of values 1, 2, and 3 refers to CDM groups {0}, {0, 1}, and {0, 1, 2} respectively. The antenna ports $\{p_0, \ldots, p_{v-1}\}$ shall be determined according to the ordering of DMRS port(s) given by Tables 7.3.1.2.2-1/2/3/4.

TABLE 7B-continued

If a UE is configured with both dmrs-DownlinkForPDSCH-MappingTypeA and dmrs-DownlinkForPDSCH-MappingTypeB, the bitwidth of this field equals max $\{x_A, x_B\}$, where $x_A$ is the "Antenna ports" bitwidth derived according to dmrs-

TABLE 7C

DownlinkForPDSCH-MappingTypeA and $x_B$ is the "Antenna ports" bitwidth derived according to dmrs-DownlinkForPDSCH-MappingTypeB. A number of $|x_A - x_B|$ zeros are padded in the MSB of this field, if the mapping type of the PDSCH corresponds to the smaller value of $x_A$ and $x_B$.
Transmission configuration indication - 0 bit if higher layer parameter tci-PresentInDCI is not enabled; otherwise 3 bits as defined in Subclause 5.1.5 of [6, YS38.214].
If "Bandwidth part indicator" field indicates a bandwidth part other than the active bandwidth part,
  if the higher layer parameter tci-PresentInDCI is not enabled for the CORESET used for the PDCCH carrying the DCI format 1_1,
    the UE assumes tci-PresentInDCI is not enabled for all CORESETs in the indicated bandwidth part;
  otherwise,
    the UE assumes tci-PresentInDCI is enabled for all CORESETs in the indicated bandwidth part.
SRS request - 2 bits as defined by Table 7.3.1.1.2-24 for UEs not configured with supplementaryUplink in ServingCellConfig in the cell: 3 bits for UEs configured with supplementaryUplink in ServingCellConfig in the cell where the first bit is the non-SUL/SUL indicator as defined in Table 7.3.1.1.1-1 and the second and third bits are defined by Table 7.3.1.1.2-24. This bit field may also indicate the associated CSI-RS according to Subclause 6.1.1.2 of [6, TS 38.214].
CBG transmission information (CBGTI) - 0 bit if higher layer parameter codeBlockGroupTransmission for PDSCH is not configured, otherwise, 2, 4, 6, or 8 bits as defined in Subclause 5.1.7 of [6, TS38.214], determined by the higher layer parameters maxCodeBlockGroupsPerTransportBlock and maxNroCodeWordsScheduledByDCI for the PDSCH.
CBG flushing out information (CBGFI) - 1 bit if higher layer parameter codeBockGroupFlushIndicator is configured as "TRUE", 0 bit otherwise.
DMRS sequence initialization - 1 bit.

The BS may configure the UE with a table for TDRA information about a PDSCH and a PUSCH via higher layer signaling (e.g., RRC signaling). For a PDSCH, a table including up to maxNrofDL-Allocations=16 entries may be configured and, for a PUSCH, a table including up to maxNrofUL-Allocations=16 entries may be configured. The TDRA information may include PDCCH-to-PDSCH slot timing (which is designated K0 and corresponds to the time interval between the time of reception of the PDCCH and the time of transmission of the PDSCH scheduled by the received PDCCH) or PDCCH-to-PUSCH slot timing (which is designated K2 and corresponds to the time interval between the time of PDCCH and the time of transmission of the PUSCH scheduled by the received PDCCH), information about the position of the start symbol where the PDSCH or PUSCH is scheduled in the slot, the length of the scheduled symbol, and the mapping type of the PDSCH or PUSCH. For example, information, such as in Table 8 and Table 9 below, may be provided from the BS to the UE through higher layer signaling (e.g., RRC signaling) or L1 signaling (e.g., DCI).

TABLE 8

PDSCH-TimeDomainResourceAllocationList information element

```
PDSCH-TimeDomainResourceAllocationList ::= SEQUENCE
(SIZE(1..maxNrofDL-Allocations)) OF PDSCH-
TimeDomainResource.Allocation
PDSCH-TimeDomainResourceAllocation ::= SEQUENCE {
    k0                              INTEGER(0..32)
OPTIONAL, -- Need S
    (PDCCH-toPDSCH timing, slot unit)
    mappingType                     ENUMERATED {typeA,
typeB},
    (PDSCH mapping type)
    startSymbolAndLength            INTEGER (0..127)
    (start symbol and length of PDSCH)
}
```

TABLE 9

PUSCH-TimeDomainResourceAllocation information element

```
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
    k2                              INTEGER(0..32)
OPTIONAL, -- Need S
    (PDCCH-to-PUSCH timing, slot unit)
    mappingType                     ENUMERATED {typeA,
typeB},
    (PUSCH mapping type)
    startSymbolAndLength            INTEGER (0..127)
    (start symbol and length of PUSH)
}
```

The BS may provide the UE with one of the entries included in the table for the TDRA information via L1 signaling (e.g., DCI) (e.g., it may be indicated with the 'time domain resource allocation' field in the DC). The UE may obtain TDRA information about the PDSCH or PUSCH based on the DCI received from the BS.

5G supports two types, e.g., resource allocation type 0 and resource allocation type 1, as methods for indicating frequency domain resource allocation information about the PDSCH and the PUSCH.

Resource Allocation Type 0

RB allocation information may be provided from the BS to the UE in the form of a bitmap for a resource block group (RBG). The RBG may include a set of contiguous virtual RBs (VRBs), and the size P of the RBG may be determined based on a value set as a higher layer parameter (rbg-Size) and the BWP size defined in Table 10 below.

TABLE 10

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

For the BWP i whose size is $N_{BWPi}^{size}$, the total number ($N_{RBG}$) of RBGs may be defined as in Equation 1 below.

$$N_{RBG} = \lceil (N_{BWP,i}^{size} + (N_{BWP,i}^{start} \bmod P))/P \rceil \quad (1)$$

In Equation 1:
the size of the first RBG is $RBG_0^{size} = P - N_{BWP,i}^{start} \bmod P$, and
the size of the last RBG is $RBG_{last}^{size} = (N_{BWP,i}^{start} + N_{BWP,i}^{size}) \bmod P$, if $(N_{BWP,i}^{start} + N_{BWP,i}^{size}) \bmod P > 0$ and is P otherwise.
The size of all other RBGs is P.

As shown in Equation 1, when the size of the first RBG in Equation 1 is $RBG_0^{size} = P - N_{BWP,i}^{start} \bmod P$, and the size of the last RBG is $(N_{BWP,i}^{start} + N_{BWP,i}^{start}) \bmod P > 0$, $RBG_{last}^{size} = (N_{BWP,i}^{start} + N_{BWP,i}^{size}) \bmod P$, otherwise, and the size of all the other RBGs is P.

Each bit in the bitmap with a size of $N_{RBG}$ may correspond to each RBG. The RBGs may be indexed in ascending order of frequency, starting from the position of lowest position of the BWP. For $N_{RBG}$ RBGs in the BWP, RBG #0 to RBG #($N_{RBG}$−1) may be mapped from the most significant bit (MSB) to the least significant bit (LSB) of the RBG bitmap. When the bit value of a specific bit in the bitmap is, e.g., 1, the UE may determine that an RBG corresponding to the bit value has been assigned and, when the specific bit value in the bitmap is, e.g., 0, the UE may determine that no RBG is assigned corresponding to the bit value.

Resource Allocation Type 1

RB allocation information may be provided from the BS to the UE, in the form of information about the start position and length for the VRBs contiguously assigned. In this case, interleaving or non-interleaving may be further applied to the contiguously assigned VRBs. The resource allocation field of resource allocation type 1 may be configured with a resource indication value (RIV), and the RIV may be composed of the start position ($RB_{start}$) of the VRBs and the length ($L_{RBs}$) of the contiguously allocated RBs. Specifically, the RIV in the BWP of the $N_{BWP}^{size}$ size may be represented as shown in Equation 2 below.

$$\text{If } (L_{RBs} - 1) \leq \left\lfloor \frac{N_{BWP}^{size}}{2} \right\rfloor, \text{ then } RIV = (L_{RBs} - 1) + RB_{start} \text{ else } RIV = \quad (2)$$

$$N_{BWP}^{size}(N_{BWP}^{size} - L_{RBs} + 1) + (N_{BPW}^{size} - 1 - RB_{start}),$$

where $L_{RBs} \geq 1$ and shall not exceed $N_{BWP}^{size} - RB_{start}$.

The BS may configure the UE with a resource allocation type through higher layer signaling (e.g., the higher layer parameter resourceAllocation may be set to one of resourceAllocationType0, resourceAllocationType1, or dynamicSwitch). If the UE is configured with both resource allocation types 0 and 1 (or if the higher layer parameter resourceAllocation is set to dynamicSwitch in the same way), it may be indicated whether the bit corresponding to the MSB of the field indicating resource allocation in the DCI format indicating scheduling is resource allocation type 0 or resource allocation type 1, resource allocation information may be indicated via the remaining bits except for the bit corresponding to the MSB based on the indicated resource allocation type, and based thereupon, the UE may interpret the resource allocation field information about the DCI field.

If the UE is configured with either resource allocation type 0 or resource allocation type 1 (or if the higher layer parameter resourceAllocation is set to either resourceAllocationType0 or resourceAllocationType1 in the same manner), resource allocation information may be indicated based on the resource allocation type in which a field is configured indicating the resource allocation in the DCI format indicating scheduling, and based thereupon, the UE may interpret the resource allocation field information about the DCI field.

Figure 9:
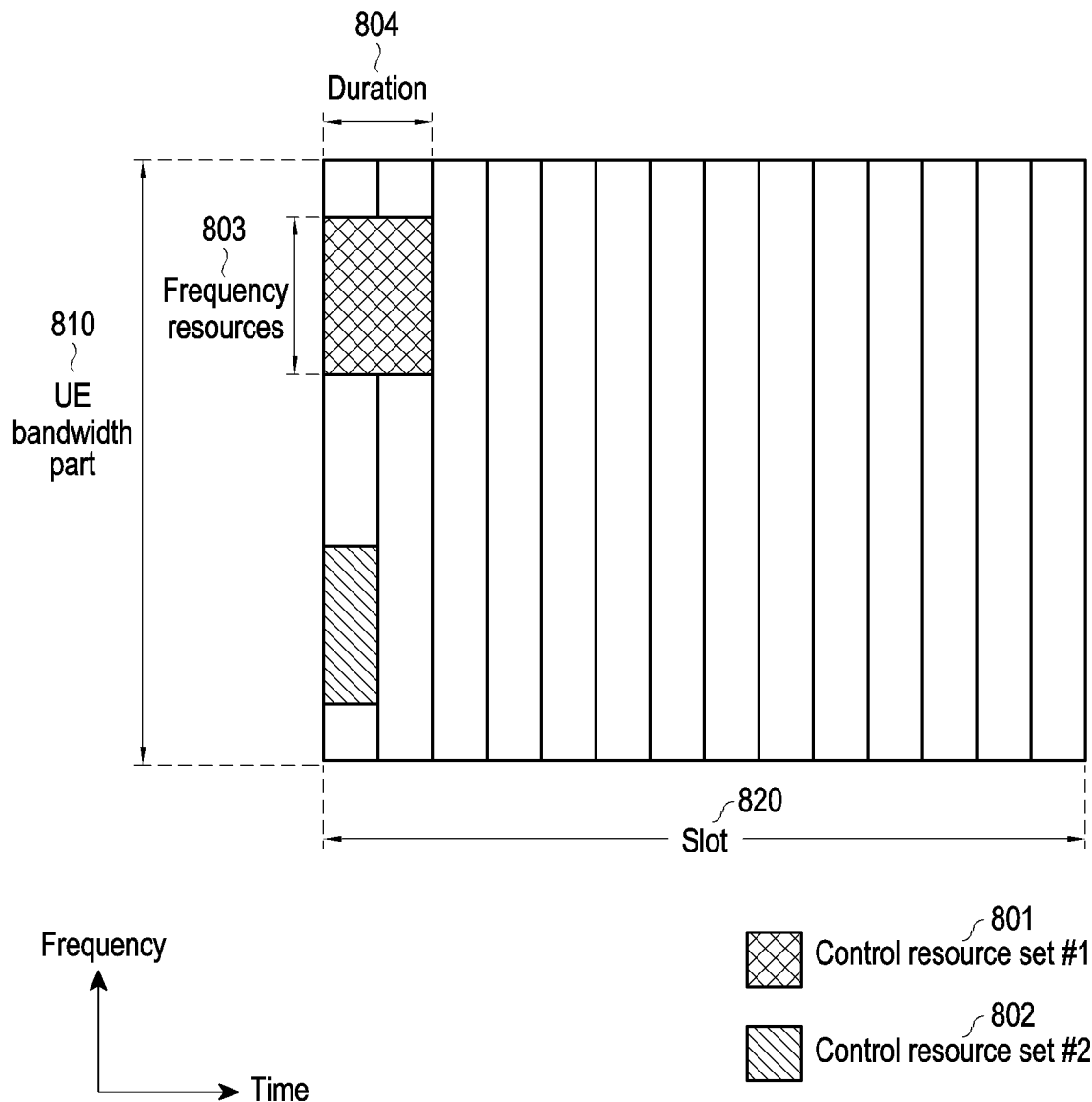
FIG. 9 illustrates a control resource set (CORESET) in a wireless communication system according to an embodiment.

FIG. 9 illustrates a CORESET in a wireless communication system according to an embodiment. Specifically, FIG. 9 illustrates an example of a CORESET in which a DL control channel signal is transmitted in a 5G wireless communication system.

Referring to FIG. 9, a UE BWP 810 is configured on the frequency axis, and two CORESETs (CORESET #1 801 and CORESET #2 802) are configured in one slot 820 on the time axis. The CORESETs may be configured in specific frequency resources of the entire UE BWP on the frequency axis.

In FIG. 9, a specific frequency resource 803 is an example of a frequency resource configured in CORESET #1 801. The CORESET may be composed of one or more OFDM symbols on the time axis, which may be defined as CORESET duration 804.

CORESET #1 801 is configured with a CORESET duration of two OFDM symbols, and CORESET #2 802 is configured with a CORESET duration of one OFDM symbol.

The above-described 5G CORESET may be configured via higher layer signaling (e.g., SI, MIB, or RRC signaling) or DCI from the BS to the UE. Configuring the UE with a CORESET includes providing the UE with various information such as a CORESET identity, frequency position of the CORESET, and symbol length of the CORESET. Configuration information for the CORESET may include, e.g., the information shown in Table 11 below.

TABLE 11

| ControlResourceSet ::= | SEQUENCE { |
|---|---|
| -- Corresponds to L1 parameter 'CORESET-ID' | |
| controlResourceSetId | |
| ControlResourceSetId, | |
| (Control Resource Set Identity)) | |
| frequencyDomainResources | BIT STRING (SIZE (45)), |
| (Frequency domain resources allocation information) | |
| duration | INTEGER |

TABLE 11-continued

```
(1..maxCoReSetEuration),
    (Time domain resources allocation information)
        cce-REG-MappingType                              CHOICE {
    (CCE-to-REG mapping type)
            interleaved
    SEQUENCE {
                req-BundleSize
    ENUMERATED {n2, n3, n6},
    (REG bundle size)
                precoderGranularity
    ENUMERATED {sameAsREG-bundle, allContiguousRBs},
                interleaverSize
    ENUMERATED {n2, n3, n6}
                (interleaver size)
                shiftIndex
    INTEGER(0..maxNrofPhysicalResourceBlocks-1)
                                    OPTIONAL
                (interleaver shift)
    },
    nonInterleaved                                   NULL
    },
    tci-StatesPDCCH
    SEQUENCE (SIZE (1..maxNrofTCI-StatesPOCCH) ) OF TCI-StateId
                OPTIONAL,
    (QCL configuration information)
        tci-PresentInDCI                             ENUMERATED
{enabled }
                        OPTIONAL, -- Need S
}
```

In Table 11, tci-StatesPDCCH (which may simply be referred to as transmission configuration indication (TCI) state) configuration information may include information about one or more SS/PBCH block (e.g., an SSB) indexes QCLed with the DMRS transmitted in a corresponding CORESET or channel state information reference signal (CSI-RS) index information.

Figure 10:
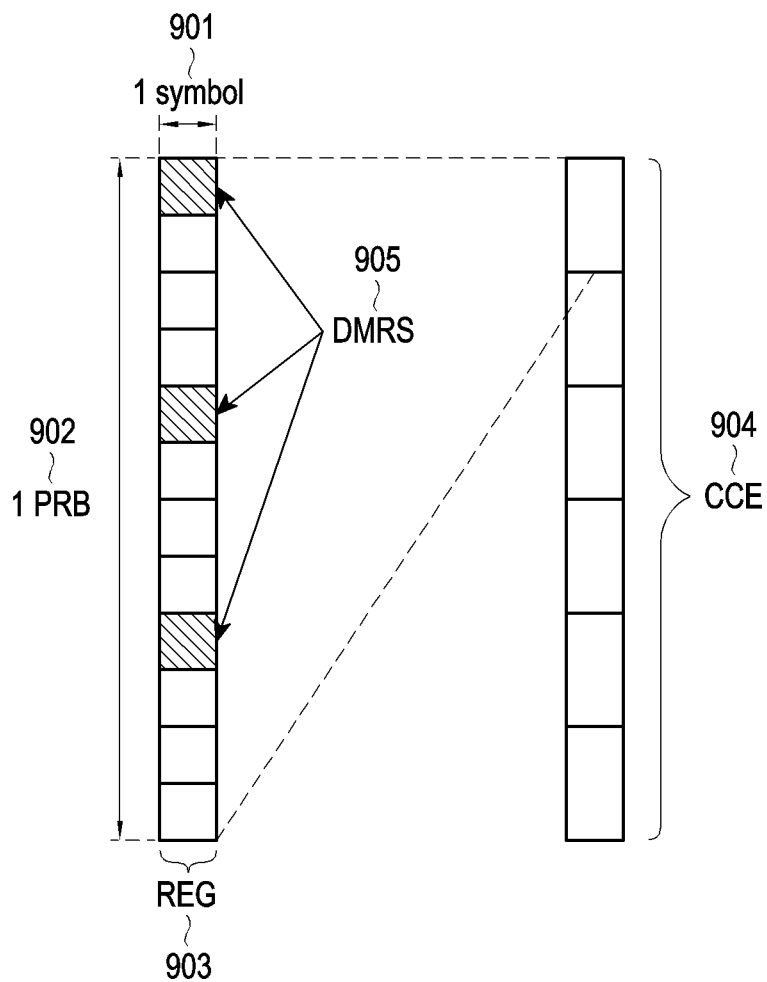
FIG. 10 illustrates a resource structure in a wireless communication system according to an embodiment.

FIG. 10 illustrates a resource structure in a wireless communication system according to an embodiment. Specifically, FIG. 10 illustrates an example of a basic unit of time and frequency resources constituting a DL control channel that may be used in 5G.

Referring to FIG. 10, the basic unit of time and frequency resources constituting the DL control channel (e.g., PDCCH) may be referred to as a resource element group (REG) 903, and the REG 903 may be defined with one OFDM symbol 901 on the time axis and with one physical RB (PRB) 902, i.e., 12 subcarriers, on the frequency axis. The BS may configure a DL control channel allocation unit by concatenating REGs 903.

When the basic unit for allocating a DL control channel in 5G is referred to as a control channel element (CCE) 904, one CCE 904 may include a plurality of REGs 903. For example, the REG 903 includes 12 REs and, if one CCE 904 is composed of, e.g., 6 REGs 903, one CCE 904 may be composed of 72 REs. If a DL CORESET is configured, the corresponding region may include a plurality of CCEs 904, and a specific DL control channel may be mapped to one or more CCEs 904 depending on the aggregation level (AL) in the CORESET and transmitted. The CCEs 904 in the CORESET are distinguished with numbers, and in this case, the numbers of the CCEs 904 may be assigned according to, e.g., a logical mapping scheme.

The basic unit, i.e., the REG 903, of the download control channel may contain REs to which the DCI is mapped and the region to which the DMRS 905, a reference signal for decoding the REs, is mapped. Three DMRSs 905 may be transmitted in one REG 903, for example. The number of CCEs for transmitting a PDCCH signal may be 1, 2, 4, 8, or 16 depending on the AL, and different numbers of CCEs may be used to implement link adaptation of DL control channel. For example, if AL=L, one DL control channel may be transmitted via L CCEs.

The UE should detect a signal while it is unaware of the information about the DL control channel. The search space that denotes a set of CCEs for blind decoding was defined. The search space is a set of candidate control channels constituted of CCEs that the UE should attempt to decode on the given AL, and since there are several ALs to create one set with 1, 2, 4, 8, or 16 CCEs, the UE has a plurality of search spaces. The search space set (Set) may be defined as a set of search spaces in all configured ALs.

Search spaces may be classified into a common search space and a UE-specific search space. A predetermined group of UEs or all the UEs may investigate the common search space of the PDCCH to receive cell-common control information, e.g., paging message, or dynamic scheduling for SI. For example, PDSCH scheduling allocation information about transmitting an SIB containing cell service provider information may be received by investigating the common search space of the PDCCH. In the case of the common search space, since a certain group of UEs or all the UEs should receive the PDCCH signal, it may be defined as a set of CCEs previously agreed on. Scheduling allocation information about the UE-specific PDSCH or PUSCH may be received by inspecting the UE-specific search space of PDCCH. The UE-specific search space may be UE-specifically defined with a function of various system parameters and the identification information (identity) for the UE.

In 5G, the parameters for the search space for the PDCCH may be configured in the UE by the BS through higher layer signaling (e.g., SIB, MIB, or RRC signaling). For example, the BS may configure the UE with the number of PDCCH candidates at each AL L, a monitoring period for search space, monitoring occasion of symbol unit in slot for search space, a search space type (common search space or UE-specific search space), a combination of RNTI and DCI format to be monitored in the search space, and a CORESET index to be monitored in the search space. Configuration information about the search space for the PDCCH may include information as shown in Tables 12A and 12B.

TABLE 12A

```
SearchSpace :: =                         SEQUENCE {
    -- Identity of the search space. SearchSpaceId = 0 identifies the
SearchSpace configured via PBCH (MIB) or ServingCellConfigCommon.
    searchSpaceId                        SearchSpaceId,
    (search space ID)
    controlRescourceSetId
    ControlResourceSetId,
    (control resource set ID)
    monitoringSlotPeriodicityAndOffset   CHOICE {
    (monitoring slot periodicity and offset)
        sl1
        NULL,
        sl2
        INTEGER (0...1),
        sl4
        INTEGER (0..3),
        sl5,
        INTEGER (0..4),
        sl8
        INTEGER (0..7),
        sl10
        INTEGER (0..9),
        sl16
        INTEGER (0..15),
        sl20
        INTEGER 0...19)
    }
                                         OPTIONAL,
```

TABLE 12B

```
    duration (monitoring length)         INTEGER (2..559)
        monitoringSymbolsWithinSlot      BIT STRING
(SIZE (14) )
                OPTIONAL,
        (monitoring symbols within slot)
        nrofCandidates                   SEQUENCE {
        (number of PDCCH candidates per aggregation level)
            aggregationLevel1            ENUMERATED
{n0, n1, n2, n3, n4, n5, n6, n8},
            aggregationLevel2            ENUMERATED
{n0, n1, n2, n3, n4, n5, n6, n8},
            aggregationLevel4            ENUMERATED
{n0, n1, n2, n3, n4, n5, n6, n8},
            aggregationLevel8            ENUMERATED
{n0, n1, n2, n3, n4, n5, n6, n8},
            aggregationLevel16
{n0, n1, n2, n3, n4, n5, n6, n8},
        },
        searchSpaceType                  CHOICE {
        (search space type)
            -- Configures this search space as common search space (CSS) and
DCI formats to monitor.
            common
        SEQUENCE {
        (common search space)
        }
            ue-Specific
        SEQUENCE {
        (UE-specific search space)
                -- Indicates whether the UE monitors in this USS for DCI
formats 0-0, and 1-0 or for formats 0-1 and 1-1
            formats
        ENUMERATED {formats0-0-And-1-0, formats0-1-And-1-1},
            ...
        }
```

According to the configuration information, the BS may configure one or more search space sets to the UE. The BS may configure the UE with search space set 1 and search space set 2 and configure it to monitor DCI format A, scrambled to X-RNTI in search space set 1, in the common search space and to monitor DCI format B, scrambled to Y-RNTI in search space set 2, in the UE-specific search space. In the X-RNTI and Y-RNTI, "X" and "Y" may correspond to one of various RNTIs to be described below.

According to the configuration information, one or more search space sets may exist in the common search space or the UE-specific search space. For example, search space set #1 and search space set #2 may be configured in the common search space, and search space set #3 and search space set #4 may be configured in the UE-specific search space.

In the common search space, a combination of DCI format and RNTI may be monitored.

Although a number of examples are provided below, various embodiments are not limited to the following examples.

DCI format 0_0/1_0 with CRC scrambled by C-RNTI, CS-RNTI, MCS-C-RNTI, SP-CSI-RNTI, RA-RNTI, temporary C-RNTI (TC-RNTI), P-RNTI, or SI-RNTI DCI format 2_0 with CRC scrambled by SFI-RNTI DCI format 2_1 with CRC scrambled by interruption RNTI (INT-RNTI)

DCI format 2_2 with CRC scrambled by TPC-PUSCH-RNTI, or TPC-PUCCH-RNTI

DCI format 2_3 with CRC scrambled by TPC-SRS-RNTI

In the UE-specific search space, a combination of DCI format and RNTI may be monitored. Although a number of examples are provided below, various embodiments are not limited to the following examples.

DCI format 0_0/1_0 with CRC scrambled by C-RNTI, CS-RNTI, or TC-RNTI

DCI format 1_0/1_1 with CRC scrambled by C-RNTI, CS-RNTI, or TC-RNTI

The RNTIs may be defined and used as follows.
C-RNTI: for scheduling UE-specific PDSCH
MCS-C-RNTI: for scheduling UE-specific PDSCH
TC-RNTI): for scheduling UE-specific PDSCH
CS-RNTI: for scheduling semi-statically configured UE-specific PDSCH
RA-RNTI: for scheduling PDSCH in the RA phase
P-RNTI: for scheduling PDSCH where paging is transmitted
SI-RNTI: for scheduling PDSCH where SI is transmitted
INT-RNTI: for indicating whether to puncture PDSCH
TPC for PUSCH RNTI (TPC-PUSCH-RNTI): for indicating power control command for PUSCH
TPC for physical UL control channel (PUCCH) RNTI (TPC-PUCCH-RNTI): for indicating power control command for PUCCH
TPC for sounding reference signal (SRS) RNTI (TPC-SRS-RNTI): for indicating power control command for SRS For example, DCI formats may be defined as shown in Table 13 below.

TABLE 13

| DCI format | Usage |
| --- | --- |
| 0_0 | Scheduling of PUSCH in one cell |
| 0_1 | Scheduling of PUSCH in one cell |
| 1_0 | Scheduling of PUSCH in one cell |
| 1_1 | Scheduling of PUSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the AL L in the CORESET p and the search space set s may be represented as shown in Equation 3 below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad (3)$$

In Equation 3:
L: AL
$n_{CI}$: carrier index
$N_{CCE,p}$: the total number of CCEs present in CORESET p
$n_{s,f}^\mu$: slot index
$M_{p,s,max}^{(L)}$: the number of PDCCH candidates of AL L
$m_{s,n_{CI}} = 0, \ldots, M_{p,s,max}^{(L)}-1$. PDCCH candidate index of AL L
$i = 0, \ldots, L-1$
$Y_{p,n_{s,f}^\mu} = (A_p \cdot Y_{p,n_{s,f}^\mu-1}) \bmod D$, $Y_{p,-1} = n_{RNTI} \neq 0$, $A_0 = 39827$, $A_1 = 39829$, $A_2 = 39839$, $D = 65537$
$n_{RNTI}$: UE identifier
$Y_{p,n_{s,f}^\mu}$ may be 0 in the case of the common search space. In the case of the UE-specific search space, $Y_{p,n_{s,f}^\mu}$ may be a value that changes depending on the UE's identity (C-RNTI or ID configured in the UE by the BS) and the time index.

The UE may access a primary cell through initial access, and the BS may additionally configure the UE with one or more secondary cells. The UE may perform communication through serving cells including the primary cell and secondary cells configured by the BS.

The BS may additionally configure whether to perform cross-carrier scheduling on the cells configured in the UE. For convenience of description, when cross-carrier scheduling is configured, cells performing scheduling (i.e., cells receiving DCI corresponding to DL assignment or UL grant) are collectively referred to as a "first cell," and a cell in which scheduling is performed (i.e., a cell in which DL or UL data is actually scheduled and transmitted/received based on DCI) is referred to as a "second cell."

If the UE is configured with cross-carrier scheduling for a specific cell A (scheduled cell) by the BS (in this case, cell A corresponds to the "second cell"), the UE does not perform PDCCH monitoring on cell A in cell A, but may perform in another cell B indicated by the cross-carrier scheduling, i.e., the scheduling cell (in this case, cell B corresponds to the "first cell."). To configure the UE with cross-carrier scheduling, the BS may configure the UE with information about the "first cell" performing scheduling on the "second cell" (e.g., the cell index of the "first cell") and the carrier indicator field (CIF) value for the "second cell."

For example, the configuration information set forth in Table 14 below may be provided from the BS to the UE through higher layer signaling (e.g., RRC signaling).

TABLE 14

| CrossCarrierSchedulingConfig ::= | SEQUENCE { |
| --- | --- |
| schedulingCellInfo | CHOICE { |
| own (self carrier scheduling) | SEQUENCE { |
| - No cross carrier scheduling | |
| cif-Presence | BOOLEAN |
| }, | |
| other (cross carrier scheduling) | SEQUENCE { |
| -Cross carrier scheduling | |
| schedulingCellId | ServCellIndex, |
| (scheduling cell index) | |
| cif-InSchedulingCell | INTEGER (1..7) |
| (CIF value) | |
| } | |
| }, | |
| ... | |
| } | |

The UE may monitor the PDCCH for the cell configured by cross-carrier scheduling in a "first cell". The UE may identify the index of the cell scheduled by the DCI received from the value of the CIF in the DCI format scheduling data, and based thereupon, may transmit/receive data in the cell indicated by the carrier indicator.

The scheduled cell (cell A) and the scheduling cell (cell B) may be configured with different numerologies. The numerology may include, e.g., the SCS and the CP. When cell A and cell B have different numerologies, and the PDCCH of cell B schedules the PDSCH of cell A, the following minimum scheduling offset between the PDCCH and the PDSCH may be additionally considered.

Cross-Carrier Scheduling Method (1) If the SCS ($\mu_B$) of cell B is smaller than the SCS ($\mu_A$) of cell A, a PDSCH may be scheduled from a next PDSCH slot which is X symbols after the last symbol of the PDCCH received from cell B. Here, X may differ depending on $\mu_B$, and may be defined as X=4 symbols when $\mu_B$=15 kHz, X=4 symbols when $\mu_B$=30 kHz, and X=8 symbols when $\mu_B$=60 kHz.

(2) If the SCS ($\mu_B$) of cell B is larger than the SCS ($\mu_A$) of cell A, a PDSCH may be scheduled from a time, X symbols after the last symbol of the PDCCH received from cell B. Here, X may differ depending on $\mu_B$, and may be defined as X=4 symbols when $\mu_B$=30 kHz, X=8 symbols when $\mu_B$=60 kHz, and X=12 symbols when $\mu_B$=120 kHz.

The BS may configure and indicate a TCI state between two different RSs or channels via proper signaling, announcing the QCL relationship between the different RSs or channels. Further, the BS may configure and indicate the TCI state for the PDCCH (or PDCCH DMRS) through appropriate signaling. The TCI state is intended for announcing a QCL relationship between different RSs or channels and a PDCCH (or a PDCCH DMRS). When different RSs or channels are QCLed, this means that, in estimating channel via reference antenna port A (reference RS #A) and RS antenna port B (target RS #B), which have a QCL relationship, the UE may apply all or some of large-scale channel parameters estimated from antenna port A to channel measurement from antenna port B.

departure (AoD), the PAS of the AoD, transmit/receive channel correlation, transmit/receive beamforming, and spatial channel correlation.

The QCL type may be configured to the UE through RRC parameter TCI-State and QCL information (QCL-Info) as shown in Table 16 below.

Referring to Table 16 below, the BS may configure the UE with one or more TCI states, indicating up to two QCL types (qcl-Type1, qcl-Type2) for the RS referencing the ID of the TCI state, i.e., the target RS. In this case, the QCL information (QCL-Info) included in each TCI state includes the serving cell index and BWP index of the RS indicated by the QCL information, type and ID of the RS, and the QCL type as shown in Table 15.

TABLE 16

```
TCI-State ::=                                                    SEQUENCE {
    tci-StateId                                                      TCI-StateId,
    (ID of the corresponding TCI state)
    (qcl-Type1                                                       QCL-Info,
    (QCL information of the first reference RS of RS (target RS) referring
to the corresponding TCI state ID)
    qcl-Type2                                                        QCL-Info
                            OPTIONAL, -- Need R
    (QCL information of the second reference RS of the RS (target RS)
referring to the corresponding TCI state ID)
    ...
}
QCL-Info ::=                                SEQUENCE {
    cell                                                             ServCellIndex
                            OPTIONAL, -- Need R
    (the serving cell index of the reference RS indicated by the corresponding
QCL information)
    bwp-Id                                                           BWP-Id
                            OPTIONAL), -- Cond CST-RS-Indicated
    {BWP index of reference RS indicated by the corresponding QCL information)
    referenceSignal                                                  CHOICE {
        csi-rs                                                       NZP-CSI-RS-
ResourceID
        ssb                                                          SSB-
Index
        (one of the CSI-RS ID or SSB ID indicated by the corresponding QCL
information)
    },
    qcl-Type                                                         ENUMERATED (typeA,
typeB, typeC, typeD},
    ...
}
```

QCL may be required to associate different parameters depending on contexts, such as 1) time tracking affected by average delay and delay spread, 2) frequency tracking affected by Doppler shift and Doppler spread, 3) radio resource measurement (RRM) affected by average gain, and 4) beam management (BM) affected by spatial parameter.

Accordingly, NR supports four QCL types as shown in Table 15 below.

TABLE 15

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatia Rx parameter |

Spatial RX parameter may collectively refer to all or some of various parameters, such as the angle of arrival (AoA), the power angle spectrum (PAS) of the AoA, the angle of The method for configuring the TCI state for the PDCCH (or the PDCCH DMRS) in the 5G communication system is the same as the description made with reference to Tables 15 and 16.

The BS may configure, to the UE, one or a plurality of TC states for a specific CORESET and activate one of the configured TCI states through TCI indication medium access control (TCI indication MAC CE) activation command. For example, {TCI state #0, TCI state #1, TCI state #2} are configured in CORESET #1 as TCI states. The BS may transmit, to the UE, a command to activate to assume TCI state #0 as the TCI state for CORESET #1, through a TCI indication MAC CE. Based on the activation command for the TCI state received through the TCI indication MAC CE, the UE may correctly receive the DMRS of the corresponding CORESET based on QCL information in the activated TC state.

If the UE is not provided with the TCI state configuration indicating the QCL information about the DMRS antenna port for receiving the PDCCH of the CORESET (or the CORESET whose CORESET ID (or index) is 0 or CORE- SET #0) configured through the MIB, the UE may assume that the physical layer channel has been QCLed in view of average gain, QCL-TypeA, and QCL-TypeD characteristics.

- DMRS (or DMRS antenna port) associated with the PDCCH received with the CORESET (or the CORE- SET whose CORESET ID is 0 or CORESET #0) configured through the MIB
- DMRS antenna port associated with the reception of the PDSCH corresponding thereto (or PDSCH scheduled by the PDCCH transmitted with CORESET #0)
- SS/PBCH block corresponding thereto (or SS/PBCH block associated with CORESET #0 or SS/PBCH block for transmitting MIB configuring the corresponding CORESET #0)

A part of the TS 38.213 standard related to what has been described above is shown in Table 17 below.

TABLE 17

The UE may assume that the DM-RS antenna port associated with PDCCH receptions in the CORESET configured by pdcch-ConfigSIB1 in MIB, the DM-RS antenna port associated with corresponding PDSCH receptions, and the corresponding SS/PBCH block are quasi co-located with respect to average gain, QCL-TypeA, and QCL-TypeD properties, when applicable [6, TS 38.214], if the UE is not provided a TCI state indicating quasi co-location infotmation of the DM-RS antennaport for PDCCH teception in the CORESET. The value for the DM-RS scrambling sequence initialization is the cell ID. A SCS is provided by subCarrierSpacingCommon in MIB.

If a search space having a search space ID 0 has been configured for the common search space set for monitoring the SI-RNTI/P-RNTI for the UE (or when the common search space set for monitoring the SI-RNTI/P-RNTI is a search space set configured with the MIB or in the case of search space #0), the UE may monitor the PDCCH in a monitoring occasion associated with SS/PBCH block A and, in this case, SS/PBCH block A may be determined as follows.

- The UE may receive a command for activating a specific TCI state for control region #0 through the TCI indication MAC CE and, in this case, the TCI state may include the CSI-RS associated with any SS/PBCH. The SS/PBCH associated with the CSI-RS in the TCI state activated through the TCI indication MAC CE most recently received by the UE may correspond to SS/PBCH block A.
- When performing RA, the UE may transmit a preamble (or PRACH) associated with a specific SS/PBCH to the BS. The SS/PBCH identified through the RA procedure most recently performed by the UE may correspond to SS/PBCH block A.

A part of the TS 38.213 standard related to what has been described above is shown in Table 18 below.

TABLE 18

If a UE is provided a zero value for searchSpaceID in PDCCH-ConfigCommon for a Type0/0A/2-PDCCH CSS set, the UE determines monitoring occasions for PDCCH candidates of the Type0/0A/2-PDCCH CSS set as described in Clause 13, and the UE is provided a C-RNTI, the UE monitors PDCCH candidates only at monitoring occasions associated with a SS/PBCH block, where the SS/PBCH block is determined by the most recent of
  a MAC CE activation command indicating a TCI state of the active BWP that includes a CORESET with index 0, as described in [6, TS 38.214], where the TCI-state includes a CSI-RS which is quasi-co-located with the SS/PBCH block, or
  a random access procedure that is not initiated by a PDCCH order that triggers a contention-free random access procedure For a CORESET (CORESET #X) whose index is set to a value other than 0,
- If the TCI state for CORESET #X is not configured for the UE or if one or more TCI states are configured, but a TCI indication MAC CE activation command for activating one of them is not received, the UE may assume that the DMRS transmitted in CORESET #X has been QCLed with the SS/PBCH block identified in the initial access process.
- If the UE has been configured with one or more TCI states as part of a handover procedure (or part of the Reconfiguration with synch procedure), but fails to receive a TCI indication MAC CE activation command to activate one of them, the UE may assume that the DMRS transmitted in CORESET #X has been QCLed with the SS/PBCH or CSI-RS resource identified during the RA procedure initiated with the handover procedure (or Reconfiguration with synch procedure).

A part of the TS 38.213 standard related to what has been described above is shown in Table 19 below.

TABLE 19

For a CORESET other than a CORESET with index 0,
if a UE has not been provided a configuration of TCI state(s) by tci-StatesPDCCH-ToAddList and tci-StatesPDCCH-ToReleaseList for the CORESET, or has been provided initial configuration of more than one TCI states for the CORESET by tci-StatesPDCCU-ToAddList and tci-StatesPDCCH-ToReleaseList but has not received a MAC CE activation command for one of the TCI states as described in [11, TS 38.321]. the UE assumes that the DM-RS antenna port associated with PDCCH receptions is quasi co-located with the SS/PBCH block the UE identified during the initial access procedure;
if a UE has been provided a configuration of more than one TCI states by tci-StatesPDCCH-ToAddList and tci-StatesPDCCH-f-ToReleaseList for the CORESET as part of Reconfiguration with sync procedure as described in [12, TS 38.331] but has not received a MAC CE activationn command for one of the TCI states as described in [11, TS 38.321], the UE assumes that the DM-RS antenna port associted with PDDCH receptions is quasi co-located with the SS/PBCH block or the CSI-RS resource the UE identified during the random access procedure initiated by the Reconfiguration with sync procedure as described in [12, TS 38.331].

For the CORESET whose index is 0 (CORESET #0), the UE may assume that the DMRS antenna port of the PDCCH received in CORESET #0 has been QCLed with the following physical resource.
- A DL reference signal included in the TCI state activated by the TCI indication MAC CE activation command; or
- If the UE does not receive the TCI indication MAC CE activation command for the TCI state, the SS/PBCH block identified by the UE through the most recently RA procedure (however, RA, not non-contention-based RA triggered in PDCCH order)

A part of the TS 38.213 standard related to what has been described above is shown in Table 20 below.

TABLE 20

For a CORESET with index 0, the UE assumes that a DM- RS antenna port for PDCCH receptions in the CORESET is quasi co-located with
the one or more DL RS configured by a TCI state, where the TO state is indicated by a MAC CE activation command for the CORESET. if any, or
a SS/PBCH block the UE identified during a most recent random access procedure not initiated by a PDCCH order that tfiggers a contention-free random access procedure, if no MAC CE activation command indicating a TCI state for the CORESET is received after the most recent random access procedure.

Various embodiments suggest various schemes for efficient multi-connectivity support, which are described below in detail.

First, higher layer signaling correspond to at least one or a combination of one or more of the following signaling.
- MIB
- SIB or SIB X (X=1, 2, . . . )
- RRC
- MAC CE
- UE Capability Reporting
- UE assistance information message Further, L1 signaling may correspond to at least one or a combination of one or more of the following physical layer channels or signaling methods.
- PDCCH
- DCI
- UE-specific DCI
- Group common DCI
- Common DCI
- Scheduling DCI (e.g., DCI used for scheduling DL or UL data)
- Non-scheduling DCI (e.g., DCI not for the purpose of scheduling DL or UL data)
- PUCCH
- UL control information (UCI)

In the following description, the definition of each mathematical operator is as follows.
- floor(X). A function that outputs the largest integer less than X.
- ceil(X): A function that outputs the smallest integer larger than X.
- A mod B: A function that outputs the remainder of dividing A by B (modulo operator)
- max(X,Y): A function that outputs the larger of X and Y
- min(X,Y): A function that outputs the smaller of X and Y Multi-Connectivity Basic Operation FIG. 11 illustrates a cell group configuration in a wireless communication system according to an embodiment.

Figure 11:
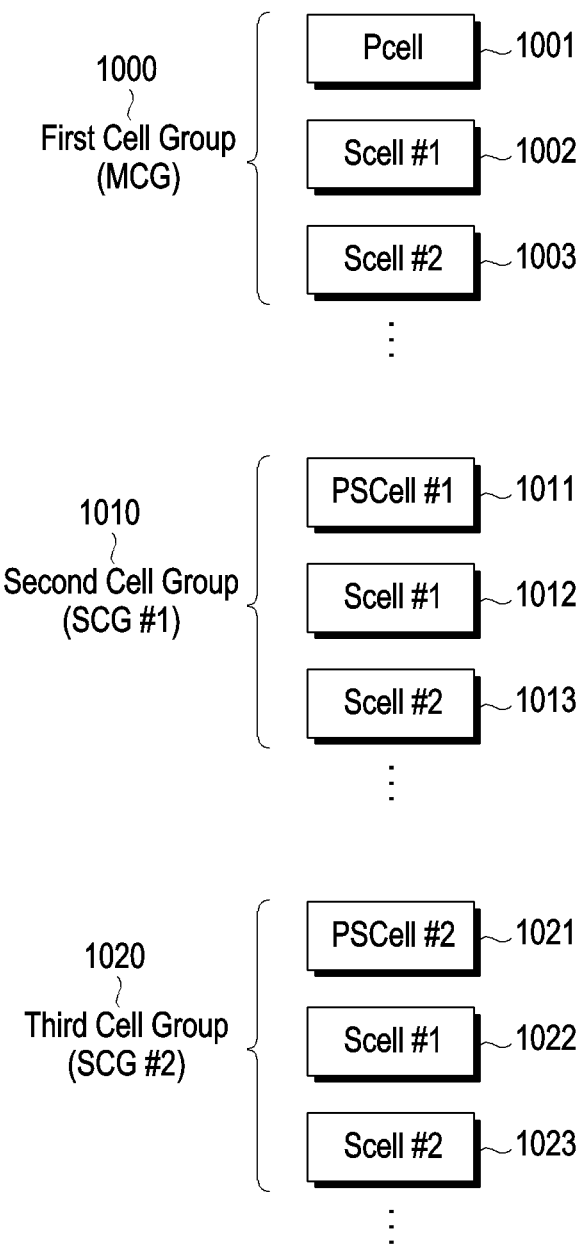
FIG. 11 illustrates a cell group configuration in a wireless communication system according to an embodiment.

Referring to FIG. 11, the BS may configure one or more cell groups for the UE. Specifically, the parameters in Tables 21A to 21C below may be configured from the BS to the UE when configuring the cell group. Tables 21A to 21C show a series of fields (information) included in the cell group configuration information element (CellGroupConfig information element) separated for convenience.

TABLE 21A

CellGroupConfig information element

```
-- ASN1START
-- TAG-CELLGROUPCONFIG-START
-- Configuration of one Cell-Group:
CellGroupConfig ::=                     SEQUENCE {
    cellGroupId                             CellGroupId,
    rlc-BearerToAddModList                  SEQUENCE (SIZE(1..maxLC-ID)) OF RLC-BearerConfig
OPTIONAL, -- Need N
    rlc-BearerToReleaseList                 SEQUENCE (SIZE(1..maxLC-ID)) OF
LogicalChannelIdentity          OPTIONAL, -- Need N
    mac-CellGroupConfig                     MAC-CellGroupConfig
OPTIONAL, -- Need M
    physicalCellGroupConfig                 PhysicalCellGroupConfig
OPTIONAL, -- Need M
    spCellConfig                            SpCellConfig
OPTIONAL, -- Need M
    sCellToAddModList                       SEQUENCE (SIZE (1..maxNrofSCells)) OF
SCellConfig                     OPTIONAL, Need N
    sCellToReleaseList                      SEQUENCE (SIZE (1..maxNrofSCells)) OF SCellIndex
OPTIONAL, -- Need N
    ...,
    [[
    reportUplinkTxDirectCurrent             ENUMERATED {true}
OPTIONAL -- Cond BWP-Reconfig
    ]],
    [[
    bap-Address-r16                         BIT STRING (SIZE (10))
OPTIONAL, -- Need M
    bh-RLC-ChannelToAddModList-r16          SEQUENCE (SIZE(1..maxBH-RLC-ChannelID-r16)) OF
BH-RLC-ChannelConfig-r16 OPTIONAL,      -- Need N
    bh-RLC-ChannelToReleaseList-r16         SEQUENCE (SIZE(1..maxBH-RLC-ChannelID-r16)) OF
Bh-XLG-ChannelID-r16    OPTIONAL,       -- Need N
    flc-TransferPath-r16                    ENUMERATED {lte, nr, both}
OPTIONAL, -- Need M
    simultaneousTCI-UpdateList1-r16         SEQUENCE (SIZE (1..maxNrofServingCellsTCI-r16))
OF ServCellIndex        OPTIONAL,       -- Need R
    simultaneousTCI-UpdateList2-r16         SEQUENCE (SIZE (1..maxNrofServingCellsTCI-r16))
OF ServCellIndex        OPTIONAL,       -- Need R
    simultaneousSpatial-UpdatedList1-r16    SEQUENCE ;SIZE (1..maxNrofServincCellsTCI-r16))
OF ServCellIndex        OPTIONAL,       -- Need R
    simultaneousSpatial-UpdatedList2-r16    SEQUENCE ;SIZE (1..maxNrofServingCeilsTCI-ri6))
OF ServCellindex        OPTIONAL,       -- Need R
    uplinkTxSwitchingOption-r16             ENUMERATED {switchedUL, dualUL}
OPTONAL,        -- Need R
    uplinkTxSwitchingPowerBoosting-r16      ENUMERATED {enabled}
OPTIONAL        -- Need R
    ]]
}
```

TABLE 21B

```
-- Serving cell specific MAC and PHY parameters for a SpCell:
SpCellConfig ::=                        SEQUENCE {
    servCellIndex                           ServCellIndex
OPTIONAL,       -- Cond SCG
    reconfigurarionWithSync                 ReconfigurarionWithSync
OPTIONAL,       -- Cond ReconfWithSync
    rlf-TimersAndConstants                  SetupRelease { RLF-TimersAndConstants }
OPTIONAL,       -- Need M
    rlmInSyncOutOfSyncThreshold             ENUMERATED {n1}
OPTIONAL,       -- Need S
    spCellConfigDedicated                   ServingCellConfig
OPTIONAL        -- Need M
    ...
}
ReconfigurationWithSync ::=     SEQUENCE {
    spCellConfigCommon                      ServingCellConfigCommon
OPTIONAL, -- Need M
    newUE-Identity                          RNTI-Value,
    t304                                    ENUMERATED {ms50, ms100, ms150, ms200, ms500, ms1000,
ms2000, ms10000},
```

TABLE 21B-continued

| | |
|---|---|
| rach-ConfigDedicated | CHOICE { |
|   uplink | RACH-ConfigDedicated, |
|   supplementaryUplink | RACH-ConfigDedicated |
| } | |
| OPTIONAL,   -- Need N | |

TABLE 21C

| | |
|---|---|
| ..., | |
| [[ | |
|   smtc | SSB-MTC |
| OPTIONAL -- Need S | |
|   ]], | |
| [[ | |
| daps-UplinkPowerConfig-r16 | DAPS-UplinkPowerConfig-r16 |
| OPTIONAL -- Need N | |
|   ]] | |
| } | |
| DAPS-Uplink-PowerConfig-r16 :: = | SEQUENCE { |
|   p-DAPS-Source-r16 | P-Max, |
|   p-DAPS-Target-r16 | P-Max, |
|   uplinkPowerSharingDAPS-Mode-r16 | ENUMERATED [semi-static-mode1, semi-static-mode2, |
| dynamic } | |
| } | |
| SCellConfig ::= | SEQUENCE { |
|   sCellIndex | SCellIndex, |
|   sCellConfigCommon | ServingCellConfigCommon |
| OPTIONAL, -- Cond SCellAdd | |
|   sCellConfigDedicated | ServingCellConfig |
| OPTIONAL, -- Cond SCellAddMod | |
| ..., | |
| [[ | |
|   smtc | SSB-MTC |
| OPTIONAL -- Need S | |
|   ]], | |
| [[ | |
|   sCellState-r16, | ENUMERATED {activated} |
| OPTIONAL, -- Cond SCellAddSync | |
|   secondaryDRX-GroupConfig-r16 | ENUMERATED {true} |
| OPTIONAL -- Cond DRX-Config2 | |
|   ]]} | |
| -- TAG-CELLGROUPCONFIG-STOP | |
| -- ASN1STOP | |

The cell group configuration (CellGroupConfig) information element as shown in Tables 21A to 21C may be used to configure a master cell group (MCG) 1000 and one or more secondary cell groups (SCGs) 1010 and 1020. A cell group includes a MAC entity, a set of logical channels with associated RLC entities, a primary cell (PCell) and one or more secondary cells (SCells). Here, one cell group may include one primary cell (Pcell) (e.g., 1001, 1011, or 1021) and one or a plurality of secondary cells (Scells) (e.g., 1002, 1003, 1012, 1013, 1022, and 1023). The primary cell 1001 in the MCG 1000 may be referred to as a PCell, and the primary cell in the SCGs 1010 and 1020 may be referred to as a primary secondary cell (PSCell) (e.g., 1011 or 1021). Each primary cell in each cell group may be collectively referred to as a special cell (SpCell). The BS may transmit configuration information regarding the secondary cell in each cell group to the UE through the SpCell in each cell group, and the UE may receive the configuration information regarding the secondary cell in the cell group to which the SpCell belongs through the SpCell. For example, the UE may receive configuration information about the SCells 1002, 1003, 1012, 1013, 1022, and 1023 in each cell group from the SpCells 1001, 1011, and 1021. the CellGroupConfig information element is described in more detail in TS 38.331 standard.

Figure 12:
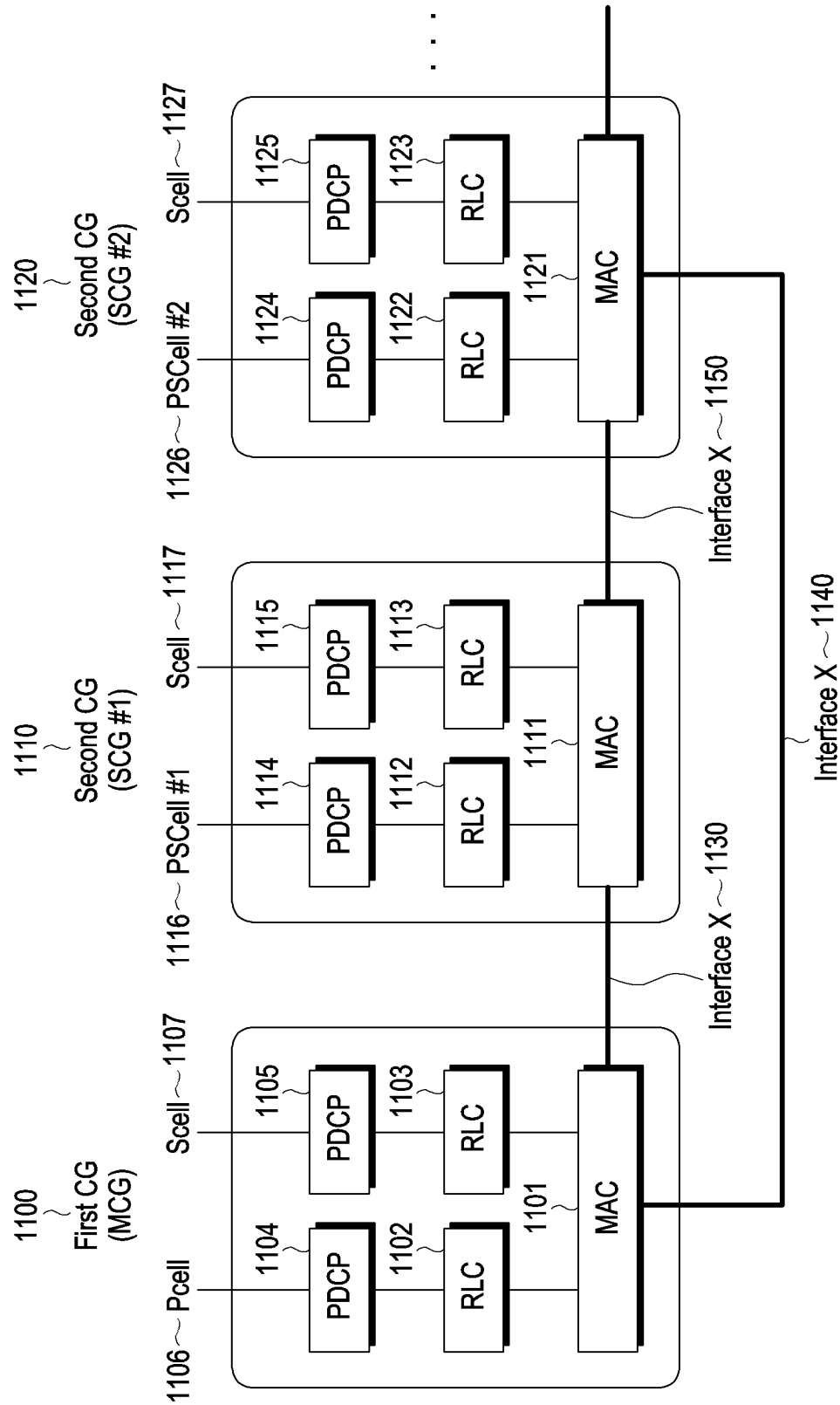
FIG. 12 illustrates higher layer entities of a cell group in a wireless communication system according to an embodiment.

FIG. 12 illustrates higher layer entities of a cell group in a wireless communication system according to an embodiment.

Referring to FIG. 12, one cell group may be configured of a set of a plurality of logical channels connected with a MAC entity and a plurality of radio link control (RLC) entities. More specifically, one cell group (e.g., 1100, 1110, or 1120) may include one primary cell (e.g., the PCell 1106 when the cell group is the MCG 1100, or the PSCell (e.g., 1116 or 1126) when the cell group is the SCG (e.g., 1110 or 1120)) and one or more secondary cells (e.g., 1107, 1117, and 1127). One MAC entity (e.g., 1101, 1111, or 1121) may exist in one cell group (e.g., 1100, 1110, or 1120), and the MAC entity (e.g., 1101, 1111, or 1121) may perform scheduling on the cells (i.e., the primary cell and one or more secondary cells in the cell group) in the cell group.

Further, one logical channel may exist for each cell in one cell group (e.g., 1100, 1110, or 1120). Accordingly, one cell group may include a plurality of RLC entities (e.g., 1102, 1103, 1112, 1113, 1122, and 1123) and packet data convergence protocol (PDCP) entities (e.g., 1104, 1105, 1114, 1115, 1124, and 1125).

The RLC entity may perform operations, such as segmentation and concatenation of packets for traffic generated in each cell, data transmission error and retransmission management, and order identification and reordering of received data.

Further, in the PDCP entity may perform operations, such as Internet protocol (IP) header compression and decompression for traffic generated in each cell, transmission of user data, and maintaining of the sequence number for the radio bearer.

Arbitrary interfaces (e.g., referred to as "interface X" in the disclosure) 1130 and 1140 for exchanging information between the MAC entities in each cell group may be defined. In FIG. 12, the MAC entity 1101 of the MCG 1100 and the MAC entity 1111 of SCG #1 1110 are connected through the interface X 1130, the MAC entity 1101 of the MCG 1100 and the MAC entity 1121 of SCG #2 1120 are connected through the interface X 1140, and the MAC entity 1111 of SCG #11110 and the MAC entity 1121 of SCG #2 1120 are connected through the interface X 1150.

The MAC entities of all or some of the cell groups may be connected through the interface X to exchange information. For example, the MAC entities of all of the cell groups may be connected through the interface X, or the MAC entities of specific cell groups may be connected through the interface X. As another example, the MAC entities of all or some of the SCGs may be connected with the MAC entity of the MCG through the interface X.

The MAC entities of any two cell groups may be connected through the interface X, and information necessary for scheduling between the two cell groups may be exchanged through the corresponding interface X. For example, referring to FIG. 12, the MAC 1101 of the MCG 1100 and the MAC 1111 entity of SCG #1 1110 may be connected through the interface X 1130, and all or part of the MAC 1101 scheduling information about the MCG 1100 and the MAC 1111 scheduling information about SCG #1 1110 may be exchanged through the corresponding interface X 1130. The BS may control the scheduling operation in each cell group based on the scheduling information exchanged between the MCG 1100 and SCG #1 1110.

The BS may notify the UE of whether the interface X exists between arbitrary cell groups through higher layer signaling, e.g., RRC signaling. The BS may set a specific field in an existing RRC message or a new RRC message as a field indicating whether the interface X exists between the cell groups, thereby notifying the UE whether the interface X exists between the cell groups. The BS may include a specific field indicating that the interface X exists between the cell groups in the existing RRC message or the new RRC message, thereby notifying the UE whether the interface X exists between the cell groups. When the specific field is included in the existing RRC message or the new RRC message, the UE may be aware that the interface X exists between the cell groups.

Further, the BS may control scheduling for the specific cell groups based on whether the interface X exists between the specific cell groups. The UE may be notified whether the interface X exists between the specific cell groups, from the BS through higher layer signaling, and based thereupon, control the transmission/reception operation in the specific cell groups.

When the specific cell groups exchange information between the MAC entities through the interface X, all or part of the information related to scheduling may be exchanged. If all of the information about the MAC entities of the specific cell groups is exchanged through the interface X, this may be similar to when the specific cell groups operate using one MAC entity. However, if part of information about the MAC entities of the specific cell groups is exchanged through the interface X, a limited scheduling operation may be performed between the specific cell groups.

The BS may provide the UE with configuration information (e.g., parameters exchanged through the interface X) related to the information exchanged through the interface X between any cell groups through higher layer signaling, e.g., RRC signaling. The BS may control the scheduling operation for the specific cell groups based on the information exchanged through the interface X. The UE may receive the configuration information related to the information exchanged through the interface X between specific cell groups from the BS through higher layer signaling. The UE may control transmission/reception operations in the specific cell groups based on the received configuration information related to the information exchanged through the interface X.

When the specific cell groups exchange information between the MAC entities through the interface X, a specific delay ($T_{delay}$) may occur. Accordingly, when the BS controls the scheduling operation for each cell group based on the information exchanged through the interface X, the delay ($T_{delay}$) may be considered.

The BS may provide the UE with configuration information (e.g., information related to whether a delay occurs, and the length of the delay) related to the delay ($T_{delay}$) caused upon exchanging information between the specific cell groups through the interface X, through higher layer signaling, e.g., RRC signaling. The BS may control the scheduling of cell groups considering the delay ($T_{delay}$). The UE may receive the configuration information related to the delay ($T_{delay}$) caused upon exchanging information between the specific cell groups through the interface X, from the BS through higher layer signaling. The UE may control the transmission/reception operations in the cell group based on the configuration information related to the delay ($T_{delay}$) identified through higher layer signaling, which is received from the BS.

Cross-Carrier Scheduling Method

Scheduling information about a cell, e.g., cell B, included in any cell group, e.g., cell group Y, may be transferred from the BS to the UE through the control channel of a cell, e.g., cell A, included in another cell group, e.g., cell group X. As such, the scheme in which scheduling is performed between the cells present in different cell groups is referred to as a 'cross-cell group scheduling' scheme.

Through the cross-cell group scheduling, the UE may monitor the PDCCH only in a specific cell in a specific cell group, without the need for monitoring the PDCCH in all the cells in each cell group, thereby reducing the power consumption of the UE. When the cell group X corresponds to a low frequency band (which may correspond to, e.g., frequency range 1 (FR1)), and the cell group Y corresponds to a high frequency band (which may correspond to, e.g., frequency range 2 (FR2)), if the UE monitors the PDCCH in each of cell A in the cell group X and cell B in the cell group Y, the UE's power consumption may be significantly increased. However, if the cross-cell group scheduling scheme is used, only the PDCCH in cell A in cell group X corresponding to the low frequency band may be monitored, so that the UE's power consumption may be significantly reduced.

Figure 13:
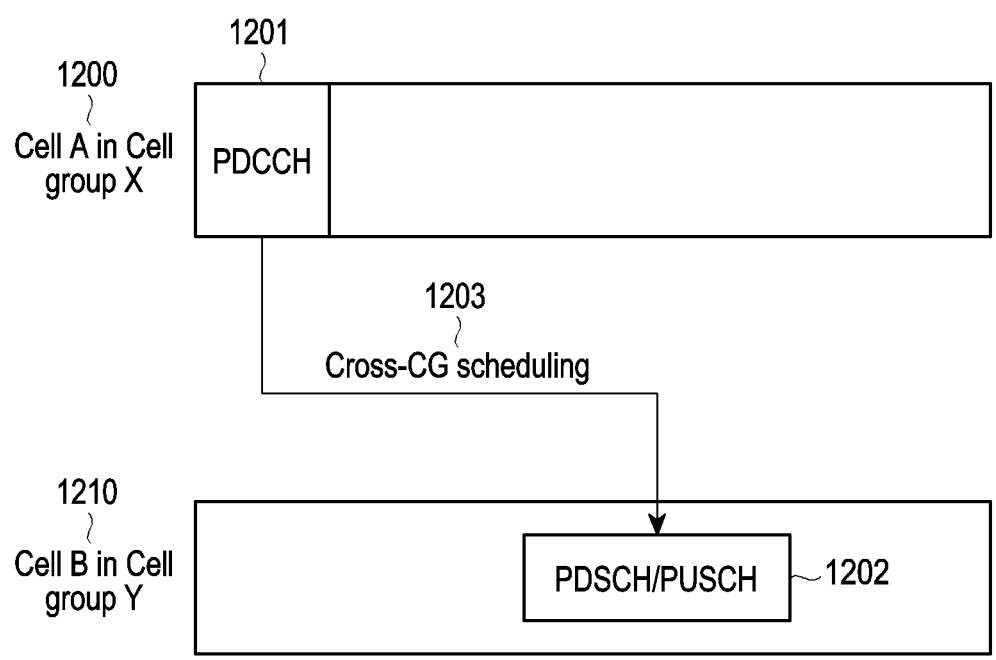
FIG. 13 illustrates a scheduling operation based on a cross-cell group scheduling scheme in a wireless communication system according to an embodiment.

FIG. 13 illustrates a scheduling operation based on a cross-cell group scheduling scheme in a wireless communication system according to an embodiment.

Referring to FIG. 13, through a DL control channel (e.g., the PDCCH 1201) of cell A 1200 included in cell group X, scheduling information about the data channel 1202 (or any transmission/reception signal/channel signal) of a cell B 1210 included in cell group Y may be transmitted. Accordingly, cell A 1200 corresponds to a scheduling cell, and cell B 1210 corresponds to a scheduled cell.

The BS may schedule the data channel (e.g., the PDSCH/PUSCH 1202) with cell B 1210 and transmit the data channel signal to the UE and may transmit the DCI including the scheduling information about the data channel 1202 to the UE through the PDCCH 1201 of the cell 1200. The UE may monitor the PDCCH 1201 present in cell A 1200 and obtain the DCI including the scheduling information about cell B 1210 through the PDCCH 1201. The UE may perform transmission/reception operations on the data channel 1202 in cell B 1210 based on the obtained scheduling information.

The BS may notify the UE whether cross-cell group scheduling is performed on the specific cell B included in the specific cell group Y through higher layer signaling, e.g., RRC signaling. Further, the BS may designate cell group X, where the DCI for cell B included in cell group Y configured so that the cross-cell group scheduling scheme is applied to the UE is transmitted, and cell A belonging to cell group X and provide the configuration information to the UE. The UE may be notified whether the cross-cell group scheduling scheme is applied to the specific cell B belonging to the specific cell group Y, from the BS through higher layer signaling. Further, the UE may perform a PDCCH monitoring operation on the DCI in the cell designated as the cell where the DCI for cell B belonging to cell group Y configured so that the cross-cell group scheduling scheme is applied is transmitted, i.e., cell A belonging to cell group X.

When cross-cell group scheduling is configured for the UE, what cell group of scheduling information the DCI received by the UE through the cell group indicator field (CGIF) in the DCI corresponds to may be indicated from the BS to the UE. When N cell groups are configured for the UE through cross-cell group scheduling, the CGIF implemented with $\log_2(N+1)$ may indicate the index of a specific cell group. The UE may perform transmission/reception operations on the data channel and signal/channel based on the scheduling information indicated by the DCI for the cell group indicated through the CGIF.

Further, when cross-cell group scheduling and cross-carrier scheduling are configured for the UE, what cell group and what cell of scheduling information the DCI received through a combination of the CGIF and the CIF in the DCI corresponds to may be indicated from the BS to the UE. When N cell groups and M cells in each cell group are configured in the UE by cross-cell group scheduling, For example, a CGIF implemented with $\log_2(N+1)$ bits may indicate the index of the cell group.

For example, a CIF implemented with $\log_2(M+1)$ bits may indicate the index of the cell.

The UE may perform transmission/reception operations on the data channel and signal/channel based on the scheduling information indicated by the DCI received for the specific cell in the specific cell group indicated by the CGIF and the CIF.

An interface X for exchanging scheduling information may be required between different cell groups in which the cross-cell group scheduling operation is performed because, since scheduling may be controlled through independent MAC entities for different cell groups, information exchange between different MAC entities existing in different cell groups is essential for cross-cell group scheduling.

Accordingly, the BS may configure whether to apply the cross-cell group scheduling scheme to cells belonging to cell groups to which MAC entities are connected through the interface X. The BS may transmit configuration information associated with the interface X, to the UE, through higher layer signaling. The UE may not expect cross-cell group scheduling to be configured between cell groups to which MAC entities are not connected through the interface X.

An interface X for exchanging scheduling information may be required between different cell groups in which the cross-cell group scheduling is performed. In this case, the interface X may be non-ideal. For example, the following restrictions may exist on interface X.

Restriction 1: When MAC information is exchanged between different cell groups through the interface X, only some information may be exchanged.

Restriction 2: When MAC information is exchanged between different cell groups through the interface X, a delay $T_{delay}$ may occur. That is, the BS may configure whether to apply the cross-cell group scheduling scheme to cells belonging to cell groups to which MAC entities are connected through the interface X.

As described above, restrictions may occur on a scheduling scheme based on a cross-cell group scheduling scheme between different cell groups based on a non-ideal interface X. When a cross-cell group scheduling scheme is used, the following restrictions may be considered.

Scheduling restriction 1: When cell A in cell group X cross-cell group schedules cell B in cell group Y, a time/frequency resource region in which a data channel may be actually scheduled in cell B may be limited within a specific time/frequency resource region. A schedulable resource region based on the cross-cell group scheduling scheme is referred to as a "scheduling-enabled region". That is, when based on the cross-cell group scheduling scheme, some resources of a specific time/frequency resource region of cell B in cell group Y may correspond to a scheduling-enabled region, and thus, a data channel may be scheduled and transmitted/received based on the cross-cell group scheduling scheme only in the scheduling-enabled region. This may correspond to a restriction that occurs when only part of MAC information is exchanged when information is exchanged between MAC entities of different cell groups, as in restriction 1 on the interface X described above.

Scheduling restriction 2: When cell A in cell group X cross-cell group schedules cell B in cell group Y, a scheduling offset longer than a specific time may be required. More specifically, it may be ensured that the scheduling offset value (K) between the PDCCH transmitted in cell A in cell group X and the data channel scheduled in cell B in cell group Y is larger than a specific value ($K_{th}$) (i.e., $K > K_{th}$). For example, it may be ensured that both the scheduling offset K0 for the PDSCH and the scheduling offset K2 for the PUSCH are scheduled as values larger than 0 or $T_{delay}$. Therefore, the UE may not expect the scheduling offset K to be indicated as a value smaller than or equal to the specific value $K_{th}$ for the cell configured by cross-cell group scheduling. This may correspond to a restriction that may occur as a delay $T_{delay}$ exists when information is exchanged between the MAC entities of different cell groups as in restriction 2 on the interface X described above.

Figure 14:
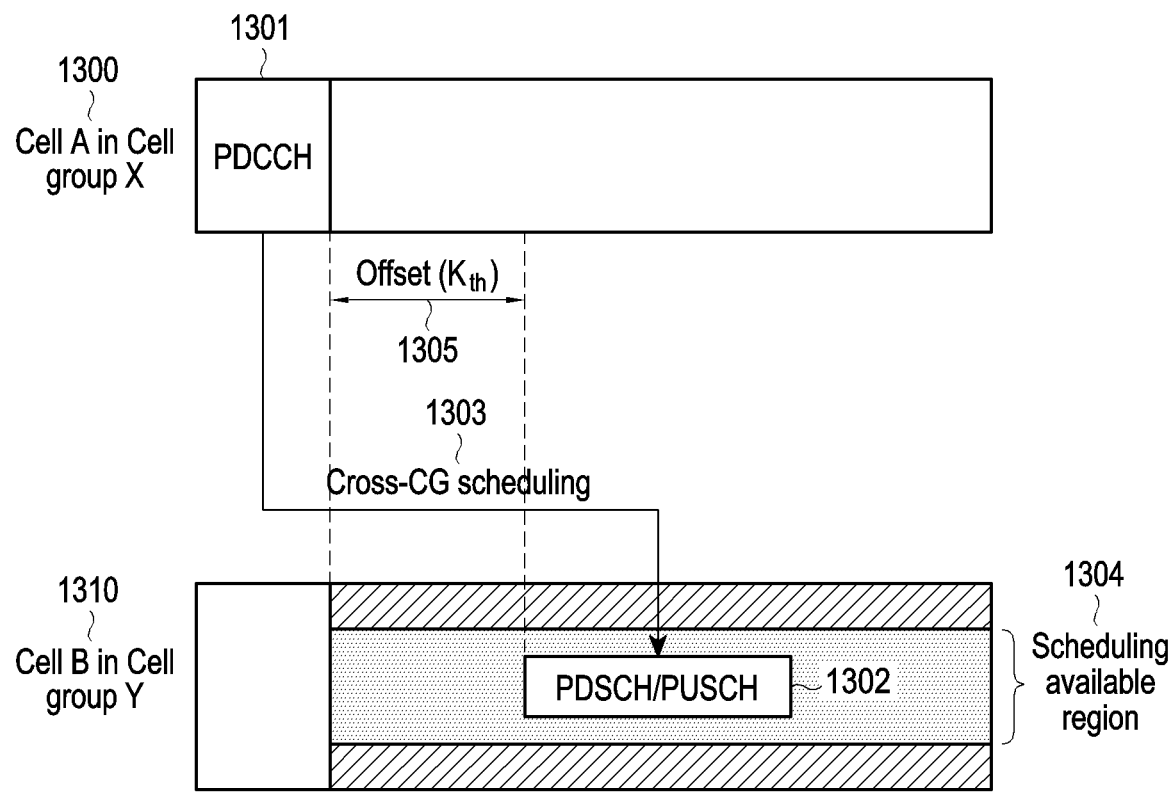
FIG. 14 illustrates a scheduling operation based on a cross-cell group scheduling scheme in a wireless communication system according to an embodiment.

FIG. 14 illustrates a scheduling operation based on a cross-cell group scheduling scheme in a wireless communication system according to an embodiment.

Referring to FIG. 14, through a DL control channel (e.g., the PDCCH 1301) of cell A 1300 belonging to cell group X, scheduling information about the data channel 1302 (or any transmission/reception signal/channel) of cell B 1310 belonging to cell group Y, may be transmitted. The UE may monitor the PDCCH 1301 in cell A 1300 belonging to cell group X and may receive scheduling DCI #B for cell B 1310 belonging to cell group Y.

In this case, the data channel may be scheduled and transmitted/received only in the time/frequency resource region designated as the scheduling-enabled region 1304 in cell B 1310. The data channel scheduled by DCI #B may always be transmitted/received in the time/frequency resource region within the scheduling-enabled region 1304.

The BS may previously configure the scheduling-enabled region 1304 in cell B 1310 to the UE through higher layer signaling. The BS may provide the UE with information about the scheduling-enabled region 1304 in cell B 1310 through higher layer signaling. The size of a specific field (e.g., a frequency resource allocation field) in DCI #B may be determined based on the scheduling-enabled region 1304. The UE may receive information about the scheduling-enabled region 1304 in cell B 1310 form the BS through higher layer signaling. The UE may determine the size of a specific field (e.g., frequency resource allocation field) of DCI #B based on the configured scheduling-enabled region 1304. The UE may monitor the PDCCH 1301 of cell A 1300 in cell group X to obtain the scheduling DCI #B for cell B 1310 in cell group Y and obtain scheduling information about any signal/channel or the data channel 1302 from the obtained DCI #B, controlling transmission/reception operations. The data channel 1302 scheduled by DCI #B may be scheduled and transmitted/received in the scheduling-enabled region 1304.

Further, the scheduling offset K for the data channel 1302 scheduled by DCI #B may be indicated as a value larger than a minimum offset ($K_{th}$) 1305 corresponding to a predefined specific value. When the BS schedules the data channel 1302 of cell B 1310 to the UE, the BS may perform scheduling so that at least $K_{th}$ or more of scheduling offset from the transmission time of the PDCCH 1301 of cell A 1300 is ensured. When scheduling DCI #B for cell B 1310, i.e., the BS, schedules the data channel 1302 of cell B 1310 to the UE, the UE may perform scheduling so that at least ($K_{th}$) 1305 or more of scheduling offset from the transmission time of PDCCH 1301 of cell A 1300 is always ensured. The minimum offset $K_{th}$ 1305 may be a predefined, fixed value, a value set from the BS to the UE through higher layer signaling, or a value that the UE notifies the BS of through the UE capability reporting. Further, the minimum offset ($K_{th}$) 1305 may have different sizes according to SCS.

Figure 15:
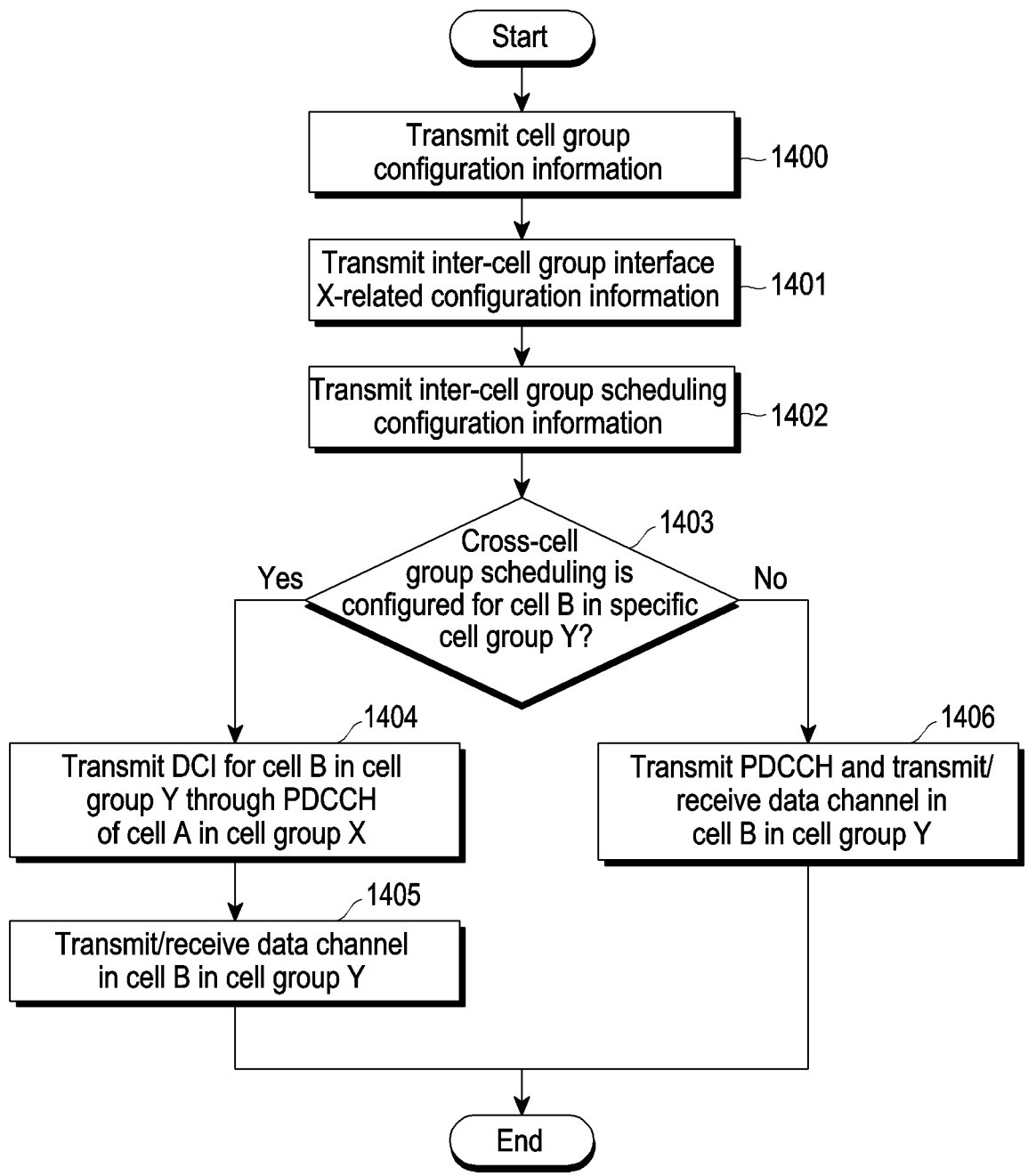
FIG. 15 is a flowchart illustrating a method of a BS in a wireless communication system according to an embodiment.

FIG. 15 is a flowchart illustrating a method of a BS in a wireless communication system according to an embodiment.

Referring to FIG. 15, in step 1400, the BS transmits cell group configuration information, which is related to the configuration of the cell group, to the UE. The cell group configuration information has been described above in detail with reference to FIGS. 11 to 14, and no further description thereof is thus given below.

In step 1401, the BS transmits configuration information related to the interface X between cell groups, to the UE. In some cases, step 1401 may be omitted. The configuration information related to the interface X between cell groups has been described above in connection with FIGS. 11 to 14, and no further description thereof is thus given below.

In step 1402, the BS transmits cross-cell group scheduling-related configuration information, to the UE. For example, cross-cell group scheduling-related configuration information may be transmitted from the BS to the UE. The configuration information related to scheduling between cell groups has been described above in connection with FIGS. 11 to 14, and no further description thereof is thus given below.

In step 1403, the BS determines whether to configure cross-cell group scheduling for cell B in a specific cell group Y.

When the BS determines to configure cross-cell group scheduling for cell B in the specific cell group Y in step 1403, the BS transmits scheduling control information about cell B in cell group Y through the PDCCH of a specific cell (e.g., cell A in cell group X) designated as the scheduling cell for cell B in step 1404. In step 1405, the BS transmits/receives the data channel for cell B to/from the UE in cell B.

However, when the BS determines not to configure cross-cell group scheduling for cell B in the specific cell group Y in step 1403, the BS transmits the PDCCH in cell B in cell group Y and transmits/receives the data channel in step 1406.

Figure 16:
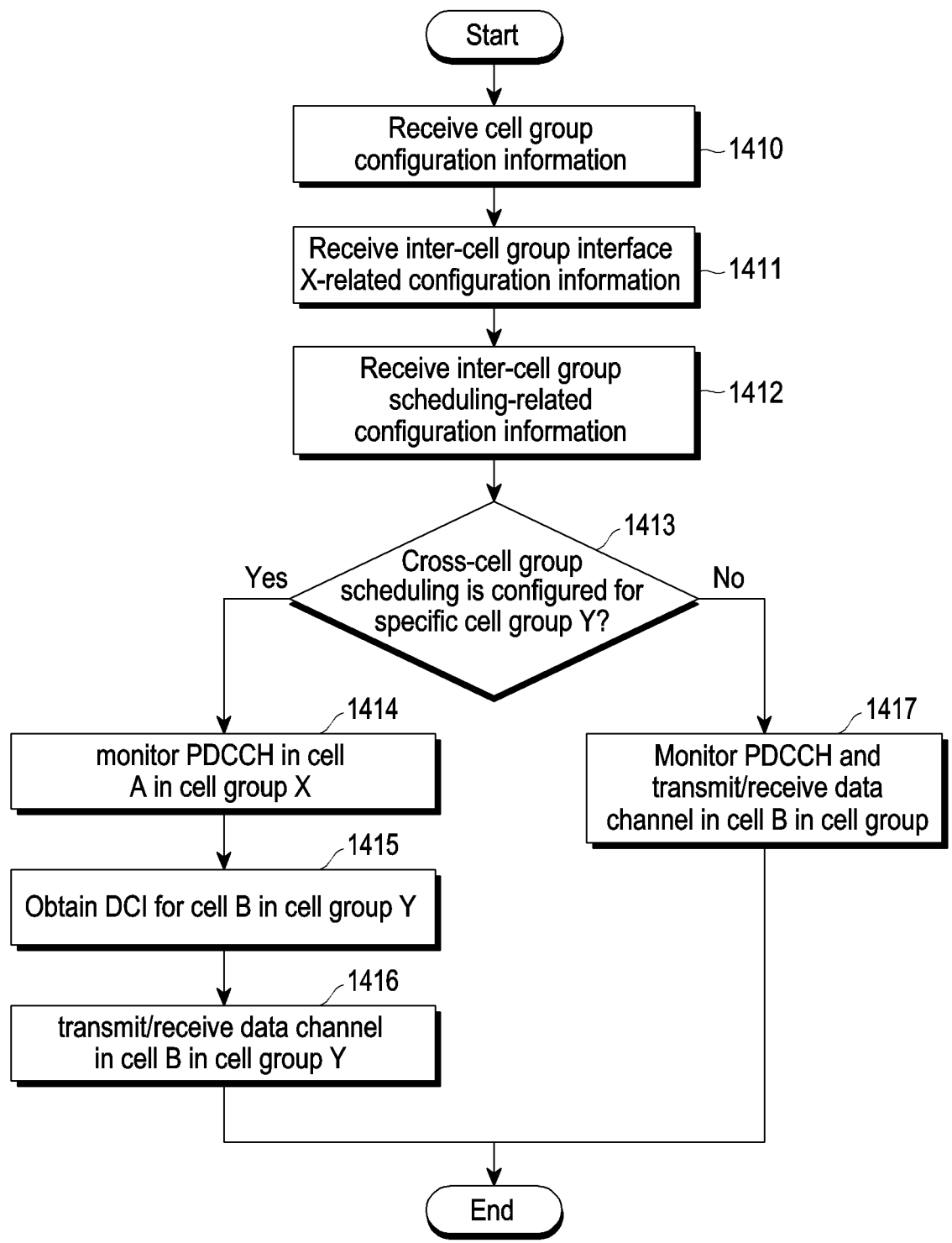
FIG. 16 is a flowchart illustrating a method of a UE in a wireless communication system according to an embodiment.

FIG. 16 is a flowchart illustrating a method of a UE in a wireless communication system according to an embodiment.

Referring to FIG. 16, in step 1410, the UE receives cell group configuration information from the BS. The cell group configuration information has been described above in detail with reference to FIGS. 11 to 14, and no further description thereof is thus given below.

In step 1411, the UE receives configuration information related to the interface X between cell groups, from the BS. In some cases, step 1411 may be omitted. The configuration information related to the interface X between cell groups has been described above in connection with FIGS. 11 to 14, and no further description thereof is thus given below.

In step 1412, the UE receives cross-cell group scheduling-related configuration information, from the BS. For example, the UE may receive cross-cell group scheduling-related configuration information from the BS. The configuration information related to scheduling between cell groups has been described above in connection with FIGS. 11 to 14, and no further description thereof is thus given below.

In step 1413, the UE determine whether to configure cross-cell group scheduling for cell B in a specific cell group Y.

When the UE determines to configure cross-cell group scheduling for cell B in the specific cell group Y in step 1413, the BS monitors scheduling control information about cell B in cell group Y through the PDCCH of a specific cell (e.g., cell A in cell group X) designated as the scheduling cell for cell B in step 1414. In step 1415, the UE obtains scheduling DCI for cell B in cell group Y. In step 1416, the UE obtains scheduling information about the data channel in cell B in cell group Y from the obtained DCI and transmits/receives the data channel based on the scheduling information.

However, when the UE determines not to configure cross-cell group scheduling for cell B in the specific cell group Y in step 1413, the UE monitors the PDCCH in cell B in cell group Y and transmits/receives the data channel in step 1417.

The BS may set (configure) whether to implement the above-described embodiments to the UE. The UE may receive configuration information regarding whether to implement the above-described embodiments from the BS and, based on the configuration information, may differently control the operation of each embodiment.

The UE may notify the BS whether the above-described embodiments may be implemented based on the UE capability report. The BS may obtain whether the functions of the above-described embodiments are supported through the capability report from the UE, and based thereupon, appropriately control the operation based on the above-described embodiments to the corresponding UE.

The above-described embodiments may be operated in combination with each other.

Figure 17:
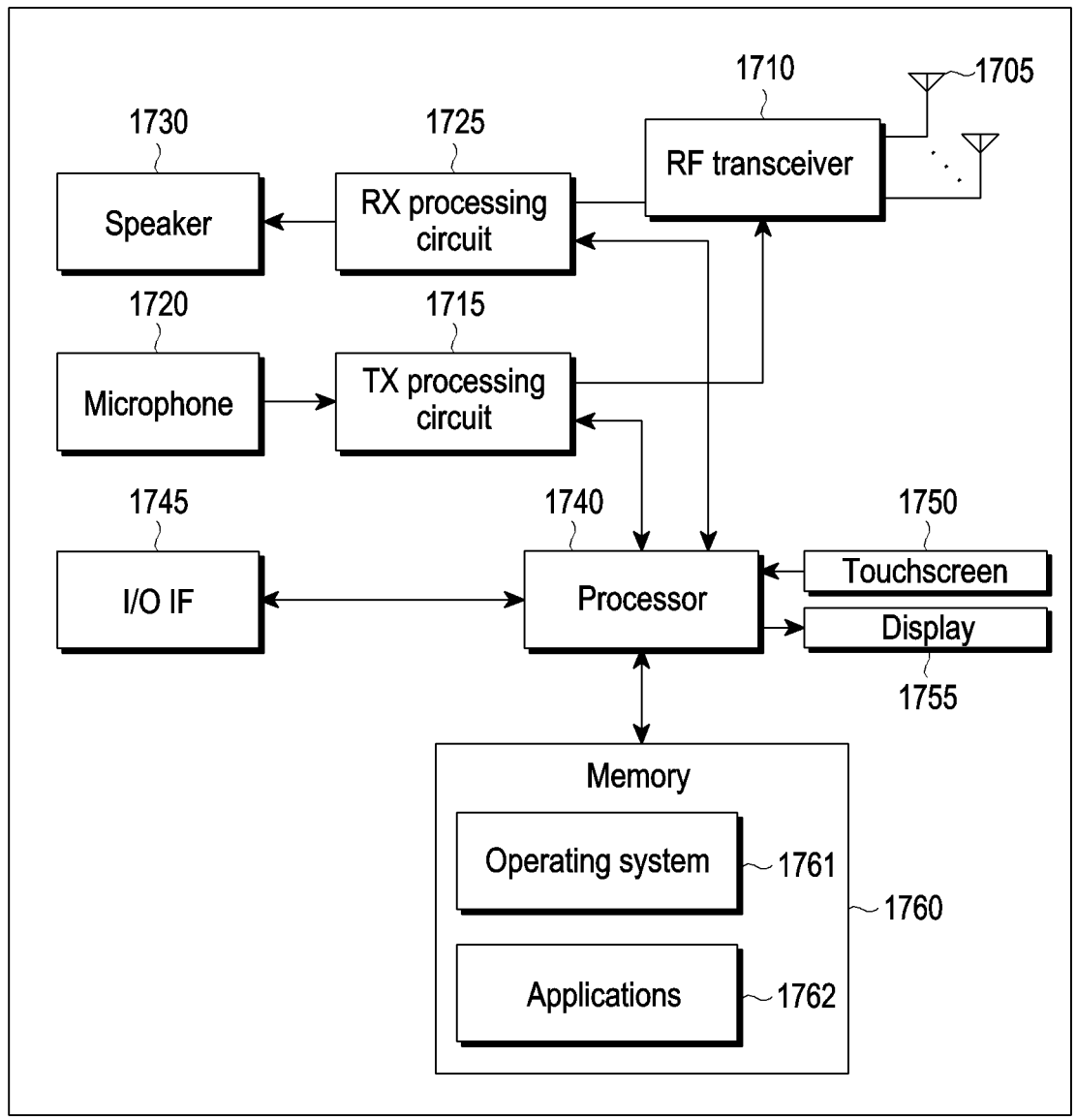
FIG. 17 illustrates a UE according to an embodiment.

FIG. 17 illustrates a UE according to an embodiment.

Referring to FIG. 17, the UE includes an antenna 1705, an RF transceiver 1710, a transmit (TX) processing circuit 1715, a microphone 1720, and a receive (RX) processing circuit 1725. The UE also includes a speaker 1730, a processor 1740, an input/output (I/O) interface (IF) 1745, a touch screen 1750, a display 1755, and a memory 1760. The memory 1760 includes an operating system (OS) 1761 and one or more applications 1762.

The RF transceiver 1710 receives an input RF signal transmitted from a BS in a network, via the antenna 1705. The RF transceiver 1710 down-converts the input RF signal, generating an intermediate frequency or baseband signal. The intermediate frequency or baseband signal is transmitted to the RX processing circuit 1725, and the RX processing circuit 1725 filters, decodes, and/or digitizes the baseband or intermediate frequency signal, generating a processed baseband signal. The RX processing circuit 1725 sends the processed baseband signal to the speaker 1730 (e.g., for speech data) or the processor 1740 (e.g., for web browsing data) for further processing.

The TX processing circuit 1715 receives analog or digital speech data from the microphone 1720 or other output baseband data (e.g., web data, emails, or interactive video game data) from the processor 1740. The TX processing circuit 1715 encodes, multiplexes, and/or digitizes the output baseband data, generating a processed baseband or intermediate frequency signal. The RF transceiver 1710 receives the processed baseband or intermediate frequency signal output from the TX processing circuit 1715 and up-converts the baseband or intermediate frequency signal into an RF signal which is to be transmitted through the antenna 1705.

The processor 1740 may include one or more processors or other processing devices, and may execute the OS 1761 stored in the memory 1760 to control the overall operation of the UE. The processor 1740 may control reception of DL channel signals and transmission of UL channel signals by the RF transceiver 1710, the RF processing circuit 1725, and the TX processing circuit 1715 according to known principles. The processor 1740 may include at least one microprocessor or microcontroller.

The processor 1740 controls the overall operation related to an operation related to multi-connectivity, e.g., an operation related to an interface between cell groups and an operation related to cross-cell group scheduling. The processor 1740 controls the overall operation related to an operation related to multi-connectivity as described above in connection with FIGS. 11 to 16, e.g., an operation related to an interface between cell groups and an operation related to cross-cell group scheduling.

The processor 1740 may move data into or out of the memory 1760 as required by a running process. The processor 1740 may be configured to execute the applications 1762 based on the OS program 1761 or in response to signals received from BSs or the operator. The processor 1740 is coupled to the I/O IF 1745, and the I/O interface 1745 provides the UE with connectability to other devices, e.g., laptop computers and handheld computers. The I/O IF 1745 is a communication path between these accessories and the processor 1740.

The processor 1740 is also connected to the touch screen 1750 and the display unit 1755. The operator of the UE may input data into the UE using the touch screen 1750. The display 1755 may be a liquid crystal display (LCD), a light emitting diode (LED) display, or other displays capable of rendering text and/or at least limited graphics, such as from websites.

The memory 1760 is connected to the processor 1740. A portion of the memory 1760 may include a RA memory (RAM), and the remainder of the memory 1760 may include a flash memory or a read-only memory (ROM).

Although FIG. 17 illustrates an example UE, various changes may be made thereto. For example, various components of FIG. 17 may be combined together, each component may be further divided, or some components may be omitted, or other components may be added as necessary. The processor 1740 may be divided into multiple processors, such as one or more central processing units (CPUs) and one or more graphics processing units (GPUs). Although the UE is configured like a mobile phone or a smart phone in FIG. 17, the UE may be configured to operate as a different type of mobile or stationary device.

A device and method according to the embodiments may efficiently perform scheduling for multi-connectivity in a wireless communication system as described above.

A device and method according to embodiments may efficiently perform scheduling between cells existing in different cell groups in a wireless communication system.

A device and method according to embodiments may efficiently perform cross-cell group scheduling in a wireless communication system.

Effects are not limited to the foregoing, and other unmentioned effects would be apparent to one of ordinary skill in the art from the following description.

A UE according to an embodiment may be an electronic device, and the electronic device may be a device in various types. The electronic devices may include a portable communication device (e.g., a smart phone), a computer device, a portable multimedia device, a portable medical device, a camera, a wearable device, or a home appliance. However, the electronic device is not limited to the examples described above.

Various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments may be included and provided in a computer program product. The computer program products may be traded as commodities between sellers and buyers. The computer program product may be distributed in the form of a machine-readable storage medium (e.g., compact disc ROM (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

The methods according to the embodiments descried herein may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims.

The programs (software modules or software) may be stored in RAMs, non-volatile memories including flash memories, ROMs, electrically erasable programmable ROMs (EEPROMs), magnetic disc storage devices, CD ROMs, digital versatile discs (DVDs), or other types of optical storage devices, or magnetic cassettes. The programs may also be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN), or a communication network configured of a combination thereof. The storage device may connect to the device that performs embodiments via an external port. A separate storage device over the communication network may be connected to the device that performs embodiments.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

While the disclosure has been shown and described with reference to certain embodiments thereof, it will be understood by those skilled in the art that various changes in form and details may be made therein without departing from the scope of the disclosure as defined by the appended claims and equivalents thereof.

What is claimed is:

1. A method performed by a terminal in a wireless communication system, the method comprising:
receiving first information including configuration information related to a first cell group and a second cell group;
receiving second information indicating whether an interface exists, wherein the interface is used for exchanging scheduling information between the first cell group and the second cell group;
based on the second information indicating that the interface exists, receiving, on a control channel of a first cell included in the first cell group, third information including scheduling information for a data channel of a second cell included in the second cell group, wherein the first cell group is different from the second cell group; and
exchange data with a base station on the data channel of the second cell, based on the third information and an offset between a first time point at which the control channel of the first cell is received and a second time point at which the data channel of the second cell is scheduled, wherein the offset is greater than a threshold value.

2. The method of claim 1, wherein the threshold value is set based on a period required for exchanging the scheduling information between the first cell group and the second cell group.

3. The method of claim 1, wherein the third information further includes at least one of a cell group indicator field indicating the second cell group or a carrier indicator field indicating the second cell.

4. The method of claim 1, wherein the interface is used for exchanging the scheduling information between a first medium access control (MAC) entity device of the first cell group and a second MAC entity device of the second cell group.

5. The method of claim 1, wherein scheduling for the second cell is performed based on a time for exchanging scheduling information between the first cell group and the second cell group.

6. A method performed by a base station in a wireless communication system, the method comprising:
  transmitting first information including configuration information related to a first cell group and a second cell group;
  transmitting second information indicating whether an interface exists, wherein the interface is used for exchanging scheduling information between the first cell group and the second cell group;
  based on the second information indicating that the interface exists, transmitting, on a control channel of a first cell included in the first cell group, third information including scheduling information for a data channel of a second cell included in the second cell group, wherein the first cell group is different from the second cell group; and
  exchange data with a terminal on a data channel of the second cell, based on the third information and an offset between a first time point at which the control channel of the first cell is transmitted and a second time point at which the data channel of the second cell is scheduled,
  wherein the offset is greater than a threshold value.

7. The method of claim 6, wherein the threshold value is set based on a period required for exchanging the scheduling information between the first cell group and the second cell group.

8. The method of claim 6, wherein the third information further includes at least one of a cell group indicator field indicating the second cell group or a carrier indicator field indicating the second cell.

9. The method of claim 6, wherein the interface is used for exchanging the scheduling information between a first medium access control (MAC) entity device of the first cell group and a second MAC entity device of the second cell group.

10. The method of claim 6, wherein scheduling for the second cell is performed based on a time for exchanging scheduling information between the first cell group and the second cell group.

11. A terminal in a wireless communication system, the terminal comprising:
  a transceiver; and
  a controller connected with the transceiver and configured to:
    receive, via the transceiver, first information including configuration information related to a first cell group and a second cell group,
    receive, via the transceiver, second information indicating whether an interface exists, wherein the interface is used for exchanging scheduling information between the first cell group and the second cell group,
    based on the second information indicating that the interface exists, receive, via the transceiver, on a control channel of a first cell included in the first cell group, third information including scheduling information for a data channel of a second cell included in the second cell group, wherein the first cell group is different from the second cell group, and
    exchange data, via the transceiver, with a base station, on the data channel of the second cell, based on the third information and an offset between a first time point at which the control channel of the first cell is received and a second time point at which the data channel of the second cell is scheduled,
  wherein the offset is greater than a threshold value.

12. The terminal of claim 11, wherein the threshold value is set based on a period required for exchanging the scheduling information between the first cell group and the second cell group.

13. The terminal of claim 11, wherein the third information further includes at least one of a cell group indicator field indicating the second cell group or a carrier indicator field indicating the second cell.

14. The terminal of claim 11, wherein the interface is used for exchanging the scheduling information between a first medium access control (MAC) entity device of the first cell group and a second MAC entity device of the second cell group.

15. The terminal of claim 11, wherein scheduling for the second cell is performed based on a time for exchanging scheduling information between the first cell group and the second cell group.

16. A base station (BS) in a wireless communication system, the BS comprising:
  a transceiver; and
  a controller connected with the transceiver and configured to:
    transmit, via the transceiver, first information including configuration information related to a first cell group and a second cell group,
    transmit, via the transceiver, second information indicating whether an interface exists, wherein the interface is used for exchanging scheduling information between the first cell group and the second cell group,
    based on the second information indicating that the interface exists, transmit, via the transceiver, on a control channel of a first cell included in the first cell group, third information including scheduling information for a data channel of a second cell included in the second cell group, wherein the first cell group is different from the second cell group, and
    exchange data, via the transceiver, with a terminal, on a data channel of the second cell, based on the third information and an offset between a first time point at which the control channel of the first cell is transmitted and a second time point at which the data channel of the second cell is scheduled,
  wherein the offset is greater than a threshold value.

17. The BS of claim 16, wherein the threshold value is set based on a period required for exchanging the scheduling information between the first cell group and the second cell group.

18. The BS of claim 16, wherein the third information further includes at least one of a cell group indicator field indicating the second cell group or a carrier indicator field indicating the second cell.

19. The BS of claim 16, wherein the interface is used for exchanging the scheduling information between a first medium access control (MAC) entity device of the first cell group and a second MAC entity device of the second cell group.

20. The BS of claim 16, wherein scheduling for the second cell is performed based on a time for exchanging scheduling information between the first cell group and the second cell group.

* * * * *